US010974482B2

(12) United States Patent
Suzuki et al.

(10) Patent No.: US 10,974,482 B2
(45) Date of Patent: Apr. 13, 2021

(54) LAMINATED FILM, PRODUCTION METHOD THEREOF, POLARIZING PLATE, LIQUID CRYSTAL PANEL, LIQUID CRYSTAL DISPLAY, AND TOUCH PANEL

(71) Applicant: FUJIFILM Corporation, Tokyo (JP)

(72) Inventors: Masaaki Suzuki, Kanagawa (JP); Tatsuya Iwasaki, Kanagawa (JP); Katsuyuki Takada, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 16/161,434

(22) Filed: Oct. 16, 2018

(65) Prior Publication Data

US 2019/0047249 A1 Feb. 14, 2019

Related U.S. Application Data

(63) Continuation of application No. PCT/JP2017/014161, filed on Apr. 5, 2017.

(30) Foreign Application Priority Data

Apr. 19, 2016 (JP) .............................. JP2016-083737

(51) Int. Cl.
*B32B 5/30* (2006.01)
*B32B 27/20* (2006.01)
*B32B 27/08* (2006.01)
*G02B 1/14* (2015.01)
*G02F 1/1335* (2006.01)
*B32B 27/30* (2006.01)
*B32B 27/38* (2006.01)
*G02B 5/30* (2006.01)
*G02F 1/1333* (2006.01)
*G02F 1/13357* (2006.01)
*G06F 3/041* (2006.01)
(Continued)

(52) U.S. Cl.
CPC ................ *B32B 5/30* (2013.01); *B32B 27/08* (2013.01); *B32B 27/20* (2013.01); *B32B 27/308* (2013.01); *B32B 27/38* (2013.01); *G02B 1/14* (2015.01); *G02B 5/3025* (2013.01); *G02F 1/13338* (2013.01); *G02F 1/133504* (2013.01); *G02F 1/133528* (2013.01); *G02F 1/133602* (2013.01); *G06F 3/041* (2013.01); *B29C 35/02* (2013.01); *B32B 2264/102* (2013.01); *B32B 2307/412* (2013.01); *B32B 2307/746* (2013.01); *B32B 2457/202* (2013.01); *B82Y 30/00* (2013.01); *C01B 33/12* (2013.01); *C01P 2004/04* (2013.01); *C01P 2004/64* (2013.01); *C01P 2006/12* (2013.01); *C09K 2323/03* (2020.08); *C09K 2323/031* (2020.08); *C09K 2323/033* (2020.08); *G02B 5/3033* (2013.01); *G02F 1/133502* (2013.01)

(58) Field of Classification Search
CPC ........... B32B 5/30; B32B 27/08; B32B 27/20; B32B 27/308; B32B 27/38; B32B 2457/202; B32B 2264/102; B32B 2307/412; B32B 2307/746; G02B 1/00; G02B 1/14; G02B 5/3025; G02B 5/3033; G02F 1/133504; G02F 1/1338; G02F 1/133528; G02F 1/133602; G02F 1/133502; G02F 1/13338; G06F 3/041; Y10T 428/1036; Y10T 428/1041; Y10T 428/1045; B29C 35/02; B82Y 30/00; C01B 33/12; C01P 2004/04; C01P 2004/64; C01P 2006/12; C09K 2323/03; C09K 2323/031; C09K 2323/033
See application file for complete search history.

(56) References Cited

U.S. PATENT DOCUMENTS

2010/0104858 A1\* 4/2010 Horio .................... C08J 7/0427
428/331
2010/0124631 A1 5/2010 Horio et al.
(Continued)

FOREIGN PATENT DOCUMENTS

| JP | 2010-102123 A | 5/2010 |
| JP | 5157819 B2 | 3/2013 |
| JP | 5188251 B2 | 4/2013 |
| JP | 5262609 B2 | 8/2013 |
| JP | 5455144 B2 | 3/2014 |

(Continued)

OTHER PUBLICATIONS

Office Action, issued by the Korean Intellectual Property Office dated Feb. 17, 2020, in connection with Korean Patent Application No. 10-2018-7030075.

(Continued)

*Primary Examiner* — Eli D. Strah
(74) *Attorney, Agent, or Firm* — Edwards Neils LLC; Jean C. Edwards, Esq.

(57) ABSTRACT

A laminated film having a haze of 1.0% or less and including two kinds of silica particles (silica particles A and silica particles B) in a cured layer, wherein the occupied area proportion of the silica particles A on a cross-sectional TEM image of the cured layer is 0.5% to 20.0% and satisfies the following relationship with the occupied area proportion of the silica particles B: 0.005≤occupied area proportion of silica particles A/occupied area proportion of silica particles B≤0.400, the variation coefficient of the occupied area proportion of the silica particles A on the cross-sectional TEM image of the cured layer is more than 0.5% and 3.0% or less, and the variation coefficient of the occupied area proportion of the silica particles B is 0.0% to 0.5%; a production method thereof; a polarizing plate; a liquid crystal panel; a liquid crystal display; and a touch panel.

15 Claims, No Drawings

(51) Int. Cl.
　　　*B29C 35/02*　　　(2006.01)
　　　*B82Y 30/00*　　　(2011.01)
　　　*C01B 33/12*　　　(2006.01)

(56) References Cited

U.S. PATENT DOCUMENTS

| | | |
|---|---|---|
| 2013/0164541 A1 | 6/2013 | Suwa et al. |
| 2013/0222910 A1* | 8/2013 | Yoneyama ........... G02B 5/3025 |
| | | 359/489.07 |
| 2013/0250414 A1* | 9/2013 | Eguchi .................... B32B 27/14 |
| | | 359/488.01 |

FOREIGN PATENT DOCUMENTS

| | | |
|---|---|---|
| JP | 2015-031794 A | 2/2015 |
| JP | 2015-215409 A | 12/2015 |
| KR | 10-2013-0131320 | 12/2013 |

OTHER PUBLICATIONS

International Search Report issued in PCT/JP2017/014161 dated Jul. 4, 2017.
Written Opinion issued in PCT/JP2017/014161 dated Jul. 4, 2017.
International Preliminary Report on Patentability issued by WIPO dated Oct. 23, 2018, in connection with International Patent Application No. PCT/JP2017/014161.

* cited by examiner

LAMINATED FILM, PRODUCTION METHOD THEREOF, POLARIZING PLATE, LIQUID CRYSTAL PANEL, LIQUID CRYSTAL DISPLAY, AND TOUCH PANEL

CROSS-REFERENCE TO RELATED APPLICATIONS

This application is a Continuation of PCT International Application No. PC/JP2017/014161 filed on Apr. 5, 2017, which was published under PCT Article 21(2) in Japanese and claims priority under 35 U.S.C § 119(a) to Japanese Patent Application No. 2016.083737 filed on Apr. 19, 2016. The above applications are hereby expressly incorporated by reference, in their entirety, into the present application.

BACKGROUND OF THE INVENTION

1. Field of the Invention

The present invention relates to a laminated film, a production method thereof, a polarizing plate, a liquid crystal panel, a liquid crystal display, and a touch panel.

2. Description of the Related Art

A laminated film in which a cured layer formed by curing a curable composition is formed on a substrate film as various film members, for example, a film included in an image display device such as a liquid crystal display (LCD) has been widely used. Further, incorporation of silica particles into such a cured layer has also been carried out for the purposes of control of a surface shape, and the like (refer to, for example, JP2015-031794A).

SUMMARY OF THE INVENTION

In order to make the handling of a laminated film (hereinafter also simply described as a "film") having the cured layer easier in a production step or the like, it is preferable that the surface of the laminated film is hardly bonded to the surface of other films or the like, that is, it is preferable that the laminated film has excellent anti-blocking properties. Examples of a means for improving the anti-blocking properties include addition of particles to a cured layer. Accordingly, for example, as described in JP2015-031794A, it is considered to accelerate the improvement of anti-blocking properties by incorporating silica particles into the cured layer. Meanwhile, generally in a case of adding silica particles, there is a tendency that white turbidity occurs in the film, and thus, transparency is lowered. Except for films used in some applications in which it is preferable to purposedly lower the transparency as in an anti-glare film, it is generally required to reduce the white turbidity of the film. For example, in applications in which excellent transparency is required as in an image display device, it is preferable that a laminated film used for improvement of scratch resistance, or the like has little white turbidity.

Therefore, an object of the present invention is to provide a laminated film which includes a substrate film and a cured layer obtained by curing a curable composition, and has excellent anti-blocking properties and suppressed white turbidity.

The present inventors have conducted extensive studies to accomplish the object, and as a result, have newly discovered a laminated film as below:

a laminated film including a substrate film and a cured layer obtained by curing a curable composition, in which the haze of the laminated film is 1.0% or less, the cured layer includes silica particles A: silica particles which have a hydrophobic group on the surface thereof and an average primary particle diameter in the range of 5 to 50 nm, and are observed as a continuous black portion with a length of 100 nm or more in a binarized image obtained by subjecting a cross-sectional transmission electron microscopic image of the cured layer to a binarization processing, and silica particles B: silica particles other than the silica particles A, which have a hydrophobic group on the surface thereof and an average primary particle diameter in the range of 7 to 50 nm, the occupied area proportion of the silica particles A in the cross-sectional transmission electron microscopic image of the cured layer is in the range of 0.5% to 20.0%, and satisfies a relationship of the following formula with the occupied area proportion of the silica particles B in the cross-sectional transmission electron microscopic image of the cured layer:

0.005≤occupied area proportion of silica particles A/occupied area proportion of silica particles B≤0.400, and in the cross-sectional transmission electron microscopic image of the cured layer, the variation coefficient of the occupied area proportion of the silica particles A is more than 0.5% and 3.0% or less, and the variation coefficient of the occupied area proportion of the silica particles B is in the range of 0.0% to 0.5%. That is, it became apparent that the laminated film can exhibit excellent anti-blocking properties and can also suppress white turbidity. Presumptions on this point by the present inventors will be described later.

In the present invention and the present specification, definitions of the words and/or the measurement methods are as follows.

The "curable composition" refers to a composition including one or more kinds of curable compounds. The "curable compound" refers to a compound having one or more curable groups (also referred to as polymerizable groups) in one molecule thereof, and the "curable group" refers to a group capable of undergoing a curing reaction. The cured layer obtained by curing a curable composition includes a component derived from the curable compound. The component derived from the curable compound can include a curable group contained in the curable compound in the form after undergoing a curing reaction.

The "haze" is a value measured in accordance with JIS K7136 (2000), using a haze meter (for example, a haze meter NDH2000 manufactured by Nippon Denshoku Industries Co., Ltd.) in an environment at an atmosphere temperature of 25° C. and a relative humidity of 60%. In general, the anti-glare film is a film that exhibits a haze of more than 1.0%. In contrast, the haze of the laminated film is 1.0% or less.

The "hydrophobic group" refers to a group having a solubility parameter (SP) value in the range of 10.0 to 30.0. The SP value is a value calculated by a Fedor estimation method. The details of the calculation method are described in Basics, Applications, and Calculation Methods of SP Values, p. 66: by Hideki Yamamoto: Joho Kiko Co., Ltd. (published on Mar. 31, 2005).

The cross-sectional transmission electron microscopic image of the cured layer is acquired by observing a sample (ultrathin sliced piece) for observing a cross-section having a thickness of about 50 nm cut from the laminated film, using a transmission electron microscope (TEM). The cut-out is carried out, for example, by a microtome.

A cross-sectional transmission electron microscopic image to be subjected to a binarization processing is acquired by observation at any observation magnification at which the primary particle diameters of silica particles A and silica particles B can be determined, the observation magnification being between 500,000 times and 5,000,000 times.

A binarized image which is used to classify the silica particles included in the cured layer into the silica particles A and the silica particles B is created by subjecting a cross-sectional transmission electron microscopic image (hereinafter also described as a "cross-sectional TEM image") acquired by the method to a binarization processing by the following method.

A portion of the cured layer on the cross-sectional TEM image is displayed according to a 256-gradation grayscale, and is subjected to a binarization processing by defining 0- to 50-gradation levels as a black portion and 51- to 255-gradation levels as a white section, thereby obtaining the binarized image.

In the binarized image obtained by the method, silica particles observed as a continuous black portion with a length of 100 nm or more are specified as silica particles A. Among the silica particles, the particles which are not classified into the silica particles A are specified as silica particles B. The "continuous black portion" indicates that the portion is formed with black portions, that is, that the portion does not include a white portion. The "length" in the continuous black portion refers to a length of the longest straight line among the straight lines connecting any two points on the outline of the continuous black portions. In addition, in a case where the cured layer includes particles other than the silica particles, identification of the particles as silica particles can be carried out using a well-known analysis method which is capable of analyzing components of the particles. As such an analysis method, a well-known method such as a component analysis method using a scanning electron microscope, energy dispersive X-ray spectrometry (EDS), and Auger electron spectroscopy (AES) can be used.

The "average primary particle diameter" of the particles in the cured layer is a value measured by the following method.

In the cross-sectional TEM image acquired as above, with regard to any 100 primary particles selected from the particles classified into the silica particles A, the diameters of the circles circumscribing the primary particles are determined and an arithmetic mean thereof is defined as an average primary particle diameter of the silica particles A in the cured layer. Also, for the silica particles B, on the cross-sectional TEM image acquired as above, with regard to any 100 primary particles selected from the particles classified into the silica particles B, the diameters of the circles circumscribing the primary particles are determined and an arithmetic mean thereof is defined as an average primary particle diameter of the silica particles B in the cured layer.

In addition, there are some cases where it is possible to confirm which of the silica particles for use in the formation of the cured layer are present as the silica particles A or the silica particles B in the cured layer from the types of the silica particles for use in the formation of a cured layer and the presence state of the silica particles in the cured layer. In such a case, the average primary particle diameter of the silica particles used in the preparation of a curable composition for forming the cured layer may be adopted as an average primary particle diameter of the silica particles A and/or the silica particles B in the cured layer. As a method for measuring the average primary particle diameter of the silica particles used in the preparation of the curable composition, a method for measuring an average primary particle diameter of the silica particles in the silica particle-containing compositions 1 and 2 which will be described later is used.

Values determined by the following method are used as the occupied area proportion and the variation coefficient of the silica particles A on the cross-sectional TEM image of the cured layer.

A cross-sectional TEM image is acquired by observing a sample (ultrathin sliced piece) for observing a cross-section having a thickness of about 50 nm, which is used to classify the silica particles included in the cured layer into the silica particles A and the silica particles B, by a transmission electron microscope at a magnification of 10,000×. A proportion (area proportion) for occupancy of the particles classified into the silica particles A by the above-described method in a region with an area of 2 μm×2 μm in the acquired cross-sectional TEM image is determined. In any twenty measurement points selected, a proportion for occupancy of the particles classified into the silica particles A is determined similarly, and an arithmetic mean of the values determined is defined as the occupied area proportion of the silica particles A. In addition, the "standard deviation/occupied area proportion (arithmetic mean)×100" of the area proportions in the twenty measurement points is defined as a variation coefficient (unit: %).

Values determined by the following method are used as the occupied area proportion and the variation coefficient of the silica particles B on the cross-sectional TEM image of the cured layer.

A cross-sectional TEM image is acquired by observing a sample (ultrathin sliced piece) for observing a cross-section having a thickness of about 50 nm, which is used to classify the silica particles included in the cured layer into the silica particles A and the silica particles B, by a transmission electron microscope at a magnification of 200,000. A proportion (area proportion) for occupancy of the particles classified into the silica particles B by the above-described method in a region with an area of 400 nm×400 nm in the acquired cross-sectional TEM image is determined. In any twenty measurement points selected, a proportion for occupancy of the particles classified into the silica particles B is determined similarly, and an arithmetic mean of the values determined is defined as the occupied area proportion of the silica particles B. In addition, the "standard deviation/occupied area proportion (arithmetic mean)×100" of the area proportions in the twenty measurement points is defined as a variation coefficient (unit: %).

The laminated film according to an aspect of the present invention is not limited to a laminated film in which the variation coefficients of the occupied area proportions and the occupied area proportions are both in the ranges in all the measurements which are different in the position of the cross-section of the cured layer for acquiring a cross-sectional TEM image and/or one or more measurement points. Any of laminated films in which the variation coefficient of the occupied area proportion and the occupied area proportion are both in the range in at least one measurement to be carried out for any twenty points selected after acquisition of a cross-sectional TEM image from any positions of the cross-section of the cured layer are included in the laminated film according to an aspect of the present invention.

In the aspect, the total amplitude at a wavelength of 2.50 to 5.00 μm of an unevenness profile measured on the surface of the cured layer is in the range of 0.007 to 0.050 nm, and the maximum height St of the unevenness profile measured on the surface of the cured layer is in the range of 7 to 100 nm.

The total amplitude at a wavelength of 2.50 to 5.00 μm of the unevenness profile measured on the surface of the cured layer is determined by the following method.

Using a non-contact surface shape measuring apparatus in an optical interferometry mode (for example, a non-contact type surface layer cross-sectional shape measuring system VertScan 2.0, manufactured by Mitsubishi Chemical Systems, Inc.), an unevenness profile of the surface is obtained in a visual field size of 124 μm×124 μm. For example, using the non-contact type surface-layer cross-sectional shape measuring system VertScan 2.0 manufactured by Mitsubishi Chemical Systems Inc. at a lens magnification of 10× in a phase mode, the unevenness profile can be obtained. The obtained unevenness profile is subjected to a fast Fourier transform to calculate an amplitude at every frequency of 100 (1/mm). As a value obtained by adding up the amplitude at a wavelength of 3.33 μm to 5.00 μm and the amplitude at a wavelength of 2.50 μm to 3.33 μm, the total amplitude at a wavelength of 2.50 to 5.00 μm in the uneven waveform measured on the surface of the cured layer is determined.

The "maximum height St" is obtained by the following method.

Using a non-contact surface shape measuring apparatus in an optical interferometry mode (for example, a non-contact type surface-layer cross-sectional shape measuring system VertScan 2.0, manufactured by Mitsubishi Chemical Systems, Inc.), an unevenness profile of the surface is obtained in a visual field size of 124 μm×124 μm. For example, using the non-contact type surface-layer cross-sectional shape measuring system VertScan 2.0 manufactured by Mitsubishi Chemical Systems, Inc. at a lens magnification of 10× in a phase mode, the unevenness profile can be obtained. In the obtained unevenness profile, the maximum distance in the vertical direction between the top portion of the convex portion and the bottom portion of the concave portion, adjacent to each other, is defined as a maximum height St.

In the aspect, the specific surface area by a Brunauer-Emmett-Teller (BET) method of the silica particles A is in the range of 30 to 400 $m^2/g$. The BET specific surface area is measured by the method described in J. Am. Chem. Soc. 60, 309 (1938).

In the aspect, the silica particles A have a value obtained by dividing the carbon content by the BET specific surface area in the range of 0.005 to 0.150. The carbon content can be measured by a well-known element analysis method.

In the aspect, the silica particles A have a value obtained by dividing the carbon content by the BET specific surface area in the range of 0.010 to 0.030.

In the aspect, the hydrophobic group contained in the silica particles B is selected from the group consisting of an alkylsilyl group, a vinylsilyl group-derived residue, an epoxysilyl group-derived residue, and a (meth)acryloxysilyl group-derived residue. The "vinylsilyl group-derived residue" is a group obtained after a curing reaction of a vinylsilyl group which is one of curable groups, and may be bonded to another group by a curing reaction in some cases. This also applies to the epoxysilyl group-derived residue and the (meth)acryloxysilyl group-derived residue. Further, in the present invention and the present specification, the "(meth)acryloxysilyl group" means either or both of an acryloxysilyl group and a methacryloxysilyl group. The "(meth)acryloyl group" which will be described later means either or both of an acryloyl group and a methacryloyl group, and the "(meth)acryl" means either or both of acryl and methacryl. The SP value for the residue refers to a SP value of the group before the curing reaction.

In the aspect, the curable composition includes a curable compound selected from the group consisting of a polyfunctional (meth)acrylate compound and an epoxy compound. In the present invention and the present specification, the "(meth)acrylate compound" refers to a compound having one or more (meth)acryloyl groups in one molecule thereof. The (meth)acrylate compound is also described as a (meth) acrylate. The "polyfunctional (meth)acrylate compound" refers to a compound having two or more (meth)acryloyl groups in one molecule thereof.

In the aspect, the curable composition further includes a polymerization initiator.

Another aspect of the present invention relates to a method for producing the laminated film, the method including:

a step of dispersing silica particles having a hydrophobic group on the surface thereof and an average primary particle diameter of 5 to 50 nm in an organic solvent to prepare a silica particle-containing composition 1;

a step of mixing the silica particle-containing composition 1 with a silica particle-containing composition 2 including silica particles having a hydrophobic group on the surface thereof and an average primary particle diameter of 7 to 50 nm in an organic solvent, and a curable compound to prepare a curable composition;

a step of applying the curable composition onto a substrate film; and a step of curing the applied curable composition.

The average primary particle diameter included in the silica particle-containing composition 1 and the silica particle-containing composition 2 are values measured for the silica particles included in the silica particle composition or the silica particles used for the preparation of the compositions. The measurement is carried out by observation with a transmission electron microscope. Specifically, for any fifty primary particles selected, the diameters of the circles circumscribing the primary particles are determined and an arithmetic mean thereof is defined as an average primary particle diameter. As the observation magnification of the transmission electron microscope, any magnification for determining the primary particle diameter from 500,000× to 5,000,000× is used.

In the aspect, the average secondary particle diameter of the silica particles in the silica particle-containing composition 1 is in the range of 100 to 500 nm. The average secondary particle diameter is a value measured by performing true spherical fitting (a refractive index of 1.46) using a laser diffraction scattering type particle size distribution measuring apparatus. As the measuring apparatus, for example, MicroTrac MT 3000 manufactured by Microtrac Bell Corp. can be used.

Still another aspect of the present invention relates to a polarizing plate including a polarizer and the laminated film.

Still another aspect of the present invention relates to a liquid crystal panel including a liquid crystal display element and the polarizing plate.

Still another aspect of the present invention relates to a liquid crystal display including the liquid crystal panel and a backlight unit.

Still another aspect of the present invention relates to a touch panel including the laminated film.

According to the aspect of the present invention, it is possible to provide a laminated film having a substrate film and a cured layer obtained by curing a curable composition and having excellent anti-blocking properties and suppressed white turbidity. According to the other aspects of the present invention, it is possible to provide a method for producing the laminated film, and a polarizing plate, a liquid crystal panel, a liquid crystal display, and a touch panel, each including the laminated film.

DESCRIPTION OF THE PREFERRED EMBODIMENTS

The following description is based on representative embodiments of the present invention in some cases. However, the present invention is not limited to such embodiments.

In the present invention and the present specification, a numerical range expressed using "to" means a range that includes the preceding and succeeding numerical values of "to" as the lower limit value and the upper limit value, respectively.

[Laminated Film]

The laminated film according to an aspect of the present invention is a laminated film including a substrate film and a cured layer obtained by curing a curable composition, in which the haze of the laminated film is 1.0% or less;
the cured layer includes
silica particles A: silica particles which have a hydrophobic group on the surface thereof and an average primary particle diameter in the range of 5 to 50 nm, and are observed as a continuous black portion with a length of 100 nm or more in a binarized image obtained by subjecting a cross-sectional transmission electron microscopic image of the cured layer to a binarization processing, and
silica particles B: silica particles other than the silica particles A, which have a hydrophobic group on the surface thereof and an average primary particle diameter in the range of 7 to 50 nm,
the occupied area proportion of the silica particles A in the cross-sectional transmission electron microscopic image of the cured layer is in the range of 0.5% to 20.0%, and satisfies the following formula with the occupied area proportion of the silica particles B in the cross-sectional transmission electron microscopic image of the cured layer:
$0.005 \leq$ occupied area proportion of silica particles A/occupied area proportion of silica particles B$\leq 0.400$, and
in the cross-sectional transmission electron microscopic image of the cured layer, the variation coefficient of the occupied area proportion of the silica particles A is more than 0.5% and 3.0% or less, and the variation coefficient of the occupied area proportion of the silica particles B is in the range of 0.0% to 0.5%.

With regard to the laminated film, the present inventors presume as follows. However, the present invention is not limited to the following presumption.

The silica particles A are silica particles which have an average primary particle diameter in the range and are observed as a continuous black portion with a length of 100 nm or more in the binarized image. The silica particles observed to be in such a state are considered as particles present in the more aggregated state in the cured layer, as compared with other silica particles (silica particles B). The occupied area proportion of the silica particles A in such a state is in the range of 0.5% to 20.0%, and satisfies a relationship of the formula with the occupied area proportion of the silica particles B. In addition, the present inventors have presumed that the variation coefficient of the occupied area proportion of the variation coefficient of the occupied area proportion of the silica particles A and the silica particles B to be set in the ranges would lead to the presence state of the silica particles in the cured layer which meets (1) and (2). In addition, the present inventors have considered that the silica particles set to be present in the cured layer in the state of (1) and (2) contribute to improvement of anti-blocking properties of the cured layer included in the laminated film and reduction in white turbidity.

(1) The silica particles A which are present in the more aggregated state are included in the cured layer in the state where the silica particles A are further scattered in a small amount, as compared with the silica particles B.

(2) In contrast, the silica particles B are included in a large amount and in the more uniform state, as compared with the silica particles A which are present in the more aggregated state in the cured layer.

Furthermore, the present inventors have presumed that the silica particles A and the silica particles B are silica particles having a hydrophobic group on the surface thereof, and reduction in white turbidity.

However, these are presumptions, and do not limit the present invention. In addition, the present invention is not limited to the other presumptions of the present inventors described in the present specification.

Hereinafter, the laminated film will be more specifically described.

<Cured Layer>

<<Presence State of Silica Particles A and Silica Particles B in Cured Layer>>

In the cured layer, the silica particles A and the silica particles B are present in the following state.

With regard to the occupied area proportion, the occupied area proportion of the silica particles A is in the range of 0.5% to 20.0%, and satisfies the following formula with the occupied area proportion of the silica particles B in the cross-sectional transmission electron microscopic image of the cured layer:
$0.005 \leq$ occupied area proportion of silica particles A/occupied area proportion of silica particles B$\leq 0.400$.

With regard to the variation coefficient of the occupied area proportion, the variation coefficient of the occupied area proportion of the silica particles A is more than 0.5% and 3.0% or less, and the variation coefficient of the occupied area proportion of the silica particles B is in the range of 0.0% to 0.5%.

(Occupied Area Proportion)

The occupied area proportion of the silica particles A in the cured layer is in the range of 0.5% to 20.0%. In contrast, the occupied area proportion of the silica particles B in the cured layer is higher than the occupied area proportion of the silica particles A. Specifically, the ratio of the occupied area proportion of the silica particles A to the occupied area proportion of the silica particles B (the occupied area proportion of the silica particles A/the occupied area proportion of the silica particles B) satisfies the following formula:
$0.005 \leq$ occupied area proportion of silica particles A/occupied area proportion of silica particles B$\leq 0.400$. Hereinbelow, "the occupied area proportion of the silica particles A/the occupied area proportion of the silica particles B" is also described as the "occupied area ratio A/B".

The present inventors have presumed that the occupied area proportion of the silica particles A set to 0.5% or more contributes to improvement of anti-blocking properties. From the viewpoint of further improvement of the anti-blocking properties, the occupied area proportion of the silica particles A is preferably 1.0% or more, more preferably 2.0% or more, and still more preferably 3.0% or more. In addition, the present inventors have presumed that the occupied area proportion of the silica particles A set to 20.0% or less contributes to suppression of white turbidity. From the viewpoint of further suppressing the white turbidity, the occupied area proportion of the silica particles A is preferably 15.0% or less, more preferably 10.0% or less, still more preferably 8.0% or less, even still more preferably 6.0% or less, and particularly preferably 5.0% or less.

Furthermore, the present inventors have presumed that the occupied area ratio A/B satisfying the formula, that is, the occupied area ratio A/B set in the range of 0.005 to 0.400 usually contributes to suppression of white turbidity. From the viewpoint of the above, the occupied area ratio A/B is preferably 0.010 or more, and more preferably 0.050 or more. In addition, from the same viewpoint, the occupied area ratio A/B is preferably 0.200 or less, more preferably 0.150 or less, and still more preferably 0.100 or less.

The occupied area proportion of the silica particles B is, for example, in the range of 30.0% to 92.0%, preferably in the range of 45.0% to 90.0%, and more preferably in the range of 50.0% to 70.0%. However, the occupied area proportion of the silica particles B only needs to satisfy the formula in a relationship with the occupied area proportion of the silica particles A, and are not limited to the ranges exemplified above.

The occupied area proportion of the silica particles A, the occupied area proportion of the silica particles B, and the occupied area ratio A/B can be adjusted by the types and the contents of the components of a curable composition for use in the formation of the cured layer. In this regard, the details will be described later.

(Variation Coefficient of Occupied Area Proportion)

In the cured layer, the variation coefficient of the occupied area proportion of the silica particles A is more than 0.5% and 3.0% or less. The silica particles A are silica particles observed as a continuous black portion with a length of 100 nm or more in a binarized image obtained by subjecting the cross-sectional TEM image of the cured layer to a binarization processing. As specifically described above, it is considered that the silica particles A present in such a state are present in the aggregated state, as compared with the silica particles B. Due to the aggregation, a deviation is generated in the presence state in the cured layer, and as a result, the variation coefficient of the occupied area proportion of the silica particles A is more than 0.5%, which contributes to improvement of anti-blocking properties, as presumed by the present inventors. From the viewpoint of further improvement of anti-blocking properties, the variation coefficient of the occupied area proportion of the silica particles A is preferably 0.8% or more, more preferably 1.0% or more, and still more preferably 1.5% or more. On the other hand, the present inventors have presumed that the variation coefficient of the occupied area proportion of the silica particles A to be set to 3.0% or less contributes to suppression of white turbidity. From the viewpoint of further suppressing the white turbidity, the occupied area proportion of the silica particles A is preferably 2.5% or less, and more preferably 2.0% or less.

Moreover, the silica particles A are observed as a continuous black portion with a length of 100 nm or more in the binarized image. The length of the black portion is 100 nm or more, and is, for example, in the range of 100 to 3,000 nm. However, the length is not limited to the exemplified range.

The variation coefficient of the occupied area proportion of the silica particles B in the cured layer is in the range of 0.0% to 0.5%. Since the variation coefficient of the occupied area proportion of the silica particles A is in the range, the variation coefficient of the occupied area proportion of the silica particles B is lower than the variation coefficient of the occupied area proportion of the silica particles A. The present inventors have presumed that the presence state where the silica particles B less aggregated, as compared with the silica particles A, are thus uniformly present, as compared with thus silica particles A, contributes to suppression of white turbidity. From the viewpoint of further suppressing the white turbidity, the variation coefficient of the occupied area proportion of the silica particles B is preferably in the range of 0.0% to 0.3%, more preferably in the range of 0.0% to 0.1%, and particularly preferably 0.0%.

The variation coefficients of the occupied area proportions of the silica particles A and the silica particles B can be adjusted by the types of the components of a curable composition for use in the formation of the cured layer, the preparation methods of the curable composition, or the like. In this regard, the details will be described later.

(Average Primary Particle Diameter)

The average primary particle diameter of the silica particles A is in the range of 5 to 50 nm. From the viewpoint of further improving anti-blocking properties, the average primary particle diameter of the silica particles A is preferably 7 nm or more. On the other hand, from the viewpoint of further suppressing white turbidity, the average primary particle diameter of the silica particles A is preferably 40 nm or less, more preferably 30 nm or less, still more preferably 20 nm or less, even still more preferably 15 nm or less, and particularly preferably 10 nm or less.

The average primary particle diameter of the silica particles B is in the range of 7 to 50 nm. From the viewpoint of more easily controlling the variation coefficient of the occupied area proportion to 0.0% to 0.5%, the average primary particle diameter of the silica particles B is preferably 10 nm or more. On the other hand, from the viewpoint of further suppressing white turbidity, the average primary particle diameter of the silica particles B is preferably 40 nm or less, more preferably 30 nm or less, and still more preferably 20 nm or less.

<<Surface Shape of Cured Layer>>

With regard to the surface shape of the cured layer, the total amplitude at a wavelength of 2.50 to 5.00 μm of an unevenness profile measured on the surface of the cured layer is preferably 0.050 nm or less from the viewpoint of still further suppressing white turbidity. The total amplitude is more preferably 0.040 nm or less, still more preferably 0.035 nm or less, even still more preferably 0.030 nm or less, particularly preferably 0.025 nm or less, and most preferably 0.020 nm or less. Further, from the viewpoint of further improving anti-blocking properties, the total amplitude is preferably 0.007 nm or more, and more preferably 0.010 nm or more.

Furthermore, with regard to the surface shape of the cured layer, the maximum height St of the unevenness profile measured on the surface of the cured layer of the laminated film is preferably in the range of 7 to 100 nm. In such a surface of the cured layer, the total amplitude is also more preferably in the preferred range.

From the viewpoint of further suppressing the white turbidity, the maximum height St is more preferably 80 nm or less, still more preferably 70 nm or less, even still preferably 50 nm or less, and particularly preferably 30 nm or less. In addition, from the viewpoint of further improving the anti-blocking properties, the maximum height St measured on the surface of the cured layer is more preferably 15 nm or more, and still more preferably 20 nm or more.

The above-described total amplitude and maximum height St can be adjusted by the types, the contents, the preparation methods, or the like of the components of the curable composition for use in the formation of the cured layer.

Next, the silica particles A and the silica particles B will be more specifically described.

<Silica Particles A>

The silica particles A have an average primary particle diameter in the range of 5 to 50 nm, and are present in the state as specifically described above in the cured layer of the laminated film. In an aspect, from the viewpoint of expressing appropriate aggregating properties, such silica particles A are preferably silica particles having a BET specific surface area of 30 to 400 m$^2$/g. The BET specific surface area of the silica particles A can be determined as a BET specific surface area of silica particles in a case where the silica particles for use in the formation of a cured layer are available. This also applies to the carbon content which will be described later. The BET specific surface area of the silica particles is more preferably in the range of 100 to 350 m$^2$/g, and still more preferably in the range of 160 to 300 m$^2$/g.

As the silica particles A having the above BET specific surface area, fumed silica can be preferably used. The fumed silica is a silica particle manufactured by a dry method. For the fumed silica, a production method thereof is well-known, and the fumed silica is also available as a commercially available product. For the production method for the fumed silica, reference can be made to, for example, paragraph 0020 of JP2015-031794A. Since the fumed silica is usually powder having primary particles aggregated (for example, fusion welding), it is preferable to form the cured layer using the fumed silica in order to easily obtain a cured layer including the silica particles A in the above-described state.

The silica particles A are silica particles having a hydrophobic group on the surface thereof. Further, the expression, "having a hydrophobic group on the surface thereof", in the present invention and the present specification is not limited to an aspect in which primary particles have a hydrophobic group on the surface thereof, and is also meant to be inclusive of an aspect in which aggregated particles formed by aggregation of primary particles have a hydrophobic group on the surface thereof. A production method for the silica particles having a hydrophobic group on the surface thereof is well-known, and such silica particles are also available as a commercially available product. The present inventors have presumed that the silica particles A contribute to suppression of white turbidity in a case where they are silica particles having hydrophobicity due to a group on the surface thereof. For the hydrophobicity of the silica particles A, a value (carbon content/BET specific surface area) obtained by dividing the carbon content of the silica particles A by the BET specific surface area as an index. From the viewpoint of further reduction in white turbidity, the value (carbon content/BET specific surface area) obtained by dividing the carbon content of the silica particles A by the BET specific surface area is preferably in the range of 0.005 to 0.150. In addition, from the viewpoint of increasing the hardness of the cured layer to improve scratch resistance, the value (carbon content/BET specific surface area) obtained by dividing the carbon content of the silica particles A by the BET specific surface area is more preferably 0.005 to 0.030.

A least one kind of the hydrophobic group contained in the silica particles A is a group having a solubility parameter in the range of 10.0 to 30.0 (hydrophobic group). The silica particles A may have only one kind of hydrophobic group or two or more kinds of hydrophobic groups. The hydrophobic group contained in the silica particles A is preferably a silicon (Si)-containing group. The silicon-containing group can be incorporated into the surface of the silica particles, generally by subjecting the silica particles to a surface treatment with a compound having a silanol group, called a silane coupling agent. Preferred examples of the silicon-containing group include an alkylsilyl group, a (meth)acryloxysilyl group, and an aminosilyl group. The (meth)acryloxysilyl group means either or both of an acryloxysilyl group and a methacryloxysilyl group. Further, since the (meth)acryloxysilyl group is a curable group, it may be included in the silica particles A as a (meth)acryloxysilyl group-derived residue in the cured layer.

The alkyl group contained in the alkylsilyl group may have a linear chain, a branched chain, or a ring structure. The number of carbon atoms of the alkyl group is, for example, 1 to 10, preferably 1 to 6, and more preferably 1 to 3. Further, the group as described herein in the present invention and the present specification may have a substituent or be unsubstituted unless otherwise specified. In a case where any of groups have a substituent, examples of the substituent include an alkyl group (for example, an alkyl group having 1 to 6 carbon atoms), a hydroxyl group, an alkoxy group (for example, an alkoxy group having 1 to 6 carbon atoms), a halogen atom (for example, a fluorine atom, a chlorine atom, and a bromine atom), a cyano group, an amino group, a nitro group, an acyl group, and a carboxy group. Further, for the group having a substituent, the expression, "the number of carbon atoms" means the number of carbon atoms in a portion not including a substituent. In addition, the alkylsilyl group may be any one of a monoalkylsilyl group, a dialkylsilyl group, and a trialkylsilyl group, and is preferably a dialkylsilyl group or a trialkylsilyl group, more preferably a trialkylsilyl group, and particularly preferably a trimethylsilyl group. In addition, examples of the silicon-containing group generally include a silicon-containing group incorporated by a dialkylpolysiloxane (for example, dimethylpolysiloxane) called a silicone oil and a silicon-containing group incorporated by a cyclic siloxane. Examples of the cyclic siloxane include octamethylcyclotetrasiloxane.

<Silica Particles B>

The silica particles B have an average primary particle diameter of 7 to 50 nm, and are present in the state as specifically described above in the cured layer of the laminated film. From the viewpoint of easily obtaining a cured layer including the silica particles B in the above-described state, the silica particles B are preferably colloidal silica. The colloidal silica is a silica particle (silica colloid particle) manufactured by a wet method. For the colloidal silica, a production method thereof is well-known and is also available as a commercially available product. For the production method for the colloidal silica, reference can be made to, for example, paragraph 0020 of JP2015-031794A. Since the colloidal silica is usually powder including a number of particles present as primary particles, it is preferable to form the cured layer using the colloidal silica in order to easily obtain a cured layer including the silica particles B in the above-described state.

The silica particles B are also silica particles having a hydrophobic group on the surface thereof. The present inventors have presumed that the silica particles B also contribute to suppression of white turbidity in a case where they are silica particles having a hydrophobic group on the surface thereof, thereby being imparted with hydrophobicity. The silica particles B may have only one kind of hydrophobic group or two or more kinds of hydrophobic groups. At least one kind of the hydrophobic groups contained in the silica particles B is a group having a solubility parameter in the range of 10.0 to 30.0 (hydrophobic group), and is preferably a hydrophobic group selected from the group consisting of an alkylsilyl group, a vinylsilyl group-derived residue, an epoxysilyl group-derived residue, and a (meth)acryloxysilyl group-derived residue. For the alkylsilyl group, reference can be made to the above description on the silica particles A. The vinylsilyl group, the epoxysilyl group, and the (meth)acryloxysilyl group are all curable groups. These curable groups can be included as a residue in the silica particles B in the cured layer since at least some of the curable groups can undergo a curing reaction in a step of producing a laminated film including the cured layer. Some of the curable groups can be included as an unreacted group in the silica particles B in the cured layer. It is preferable that the residue of the curable group is included in the state of being bonded to another group, preferably by a curing reaction from the viewpoint of further increasing the hardness of the cured layer. In addition, it is also preferable to further increase the hardness of the cured layer from the viewpoint of improving the scratch resistance of the laminated film having the cured layer.

<<Thickness of Cured Layer>>

The thickness of the cured layer may be set according to the uses, preferred physical properties, or the like of the laminated film having the cured layer, and is not particularly limited. For example, the thickness of the cured layer can be in the range of 1 to 50 μm. Further, in a case where a laminated film having the cured layer is used as a protective film for a polarizing plate, the thickness of the cured layer is preferably set to the range of 3 to 30 μm, and more preferably set to the range of 3 to 10 μm.

The above-described cured layer is formed by curing a curable composition. Hereinbelow, a curable composition for use in the formation of the cured layer will be described.

<Curable Composition>

(Silica Particles)

The cured layer include the silica particles A and the silica particles B. Accordingly, the curable composition for use in the formation of the cured layer includes silica particles.

The curable composition is preferably prepared by using the following two kinds of silica particles in combination:

silica particles having a hydrophobic group on the surface thereof and an average primary particle diameter of 5 to 50 nm; and silica particles having a hydrophobic group on the surface thereof and an average primary particle diameter of 7 to 50 nm.

The silica particles having an average primary particle diameter of 5 to 50 nm are more preferably silica particles having either or both of values obtained by dividing the BET specific surface area and the carbon content by the BET specific surface area, respectively, in the ranges described above for the silica particles A.

Moreover, with regard to the hydrophobic group included on the surface of the silica particles having an average primary particle diameter of 5 to 50 nm, reference can be made to the descriptions of the hydrophobic group included in the surface of the silica particles A. With regard to the hydrophobic group included on the surface of the silica particles having an average primary particle diameter of 7 to 50 nm, reference can be made to the descriptions on the hydrophobic group included on the surface of the silica particles B. However, in a case where the hydrophobic group is a curable group, the curable group is usually included in the state before the curing reaction in the silica particles in the curable composition.

From the viewpoint of easy formation of a cured layer including the above-described silica particles A and silica particles B, it is preferable that the curable composition is prepared by adding two or more kinds of silica particles having different aggregation states. In this view, it is more preferable to use fumed silica and colloidal silica in combination.

As an example, the silica particles having an average primary particle diameter of 5 to 50 nm, AEROSIL (registered trademark) R972, R9200, R974, R976S, R104, R106, RX50, NAX50, NX90G, RX200, RX300, RX380S, R812, R812S, R8200, RA200H, RY50, NY50, RY200S, RY200, RY300, R202, R805, R711, R7200, or the like, manufactured by Nippon Aerosil Co., Ltd., which is commercially available surface-hydrophobicized fumed silica, can be used.

On the other hand, as the silica particles having an average primary particle diameter of 7 to 50 nm, MEK-ST, MEK-EC-2130Y, MEK-AC-2140Z, or MEK-AC-4130Z, manufactured by Nissan Chemical Industries, Ltd., and ELECOM V-8802, ELECOM V-8803, or the like, manufactured by Nippon Shokubai Co., Ltd, which is commercially available surface-hydrophobicized colloidal silica, can be used.

Among the above-described commercially available products, there are some products which are commercially available as a dispersion liquid in which silica particles are dispersed in an organic solvent. They can be used as they are or after further addition of an organic solvent for the preparation of the curable composition.

A method for preparing the curable composition will further be described later.

(Curable Compound)

The curable composition for use in the formation of the cured layer includes at least a curable compound together with the silica particles. The curable compound may be used singly or in combination of two or more kinds thereof. A form for the curing reaction of the curable compound is not particularly limited. For example, as the curable compound, one or more compounds selected from the group consisting of a compound having a radically polymerizable group, a compound having a cationically polymerizable group, and a compound having a radically polymerizable group and a cationically polymerizable group can be used. The number of the curable groups contained in the curable compound is at least one, and preferably two or more in one molecule thereof. The curable compound having two or more curable groups in one molecule thereof may include only one kind or two or more kinds of curable groups. For the compound having only radically polymerizable groups as the curable group, the number of the radically polymerizable groups included in one molecule thereof is preferably 2 or more, more preferably 3 or more, still more preferably 4 or more, and even still more preferably 6 or more. Further, for the compound having only radically polymerizable groups as the curable group, the number of the radically polymerizable groups included in one molecule thereof is, for example, 10 or less. However, the number is not limited thereto, and may be more than 10. On the other hand, for the compound having only cationically polymerizable groups as the curable group, the number of the cationically polymerizable groups included in one molecule thereof is at least 1 or more, and preferably 2 or more. For the compound having only cationically polymerizable groups as the curable group, the number of the cationically polymerizable groups included in one molecule thereof is, for example, 6 or less. However, the number is not limited thereto, and may be more than 6. For the compound having only radically polymerizable groups and cationically polymerizable groups as the curable group, the number of the radically polymerizable groups and the number of the cationically polymerizable groups, each included in one molecule thereof, are each at least one or may be two or more. For the compound having only radically polymerizable groups and cationically polymerizable groups as the curable group, the number of the radically polymerizable groups and the number of the cationically polymerizable groups, each included in one molecule thereof, are, for example, each 3 or less. However, the number is not limited thereto, and may be more than 3.

Examples of the radically polymerizable group include an ethylenically unsaturated group. Examples of the ethylenically unsaturated group include a (meth)acryloyl group and a vinyl group, and the (meth)acryloyl group is preferable. That is, a preferred example of the curable compound may be a (meth)acrylate compound. Further, the (meth)acryloyl group may be included in the form of a (meth)acryloyloxy group in the curable compound. In an aspect, the curable compound is preferably a polyfunctional (meth)acrylate compound.

In an aspect, as at least one kind of the curable compound, a compound having two or more ethylenically unsaturated groups in one molecule thereof can be used. With regard to specific examples of such a curable compound, reference can be made to paragraph 0025 of JP2013-105160A.

Examples of the curable compound having a radically polymerizable group also include a (meth)acrylate having one or more urethane bonds in one molecule thereof (hereinafter also described as a "urethane (meth)acrylate"). Specific examples of the urethane (meth)acrylate, reference can be made to paragraph 0028 of JP2013-105160A.

Preferred examples of the cationically polymerizable group include an oxygen-containing heterocyclic group and a vinyl ether group. The oxygen-containing heterocycle may be a monocycle or a fused ring. Further, it is also preferable that the oxygen-containing heterocycle has a bicyclo skeleton. The oxygen-containing heterocycle may be a non-aromatic ring or an aromatic ring, and is preferably a non-aromatic ring. Specific examples of the monocycle include an epoxy ring, a tetrahydrofuran ring, and an oxetane ring. In addition, examples of the monocycle having a bicyclo skeleton include an oxabicyclo ring. Furthermore, the cationically polymerizable group including the oxygen-containing heterocycle is included as a monovalent substituent or a polyvalent substituent such as a divalent or higher substituent in the curable compound. In addition, the fused ring may be formed by fusion of two or more of the oxygen-containing heterocycles, or may be formed by fusion of one or more of the oxygen-containing heterocycles and one or more of the ring structures other than the oxygen-containing heterocycle. Examples of the ring structures other than the oxygen-containing heterocycle include cycloalkane rings such as a cyclohexane ring.

As the cationically polymerizable group, an epoxy group is preferable. In the present invention and the present specification, the compound having one or more epoxy groups in one molecule thereof is also referred to as an epoxy compound. The epoxy compound is more preferably a compound having an alicyclic epoxy group. The "alicyclic epoxy group" refers to a cyclic group having a structure in which an epoxy ring and a saturated hydrocarbon ring are fused. Further, the epoxy group included in the epoxysilyl group as described above may be either an epoxy group in a monocyclic structure having no fused structure or an alicyclic epoxy group, and is preferably the epoxy group in a monocyclic structure having no fused structure. The alicyclic epoxy group is preferably a cyclic group having a fused ring from an epoxy ring and a cycloalkane ring, and more preferably a 3,4-epoxycyclohexyl group. The alicyclic epoxy group may be unsubstituted or may have one or more substituents. The alicyclic epoxy group is preferably unsubstituted. Hereinafter, a compound having an alicyclic epoxy group is also referred to as an alicyclic epoxy compound. With regard to the alicyclic epoxy compound, the monofunctionality means that the number of the alicyclic epoxy groups included in one molecule is 1, and the polyfunctionality means that the number of the alicyclic epoxy groups included in one molecule is 2 or more. For example, the bifunctionality means that the number of the alicyclic epoxy groups included in one molecule is 2.

The curable compound having an alicyclic epoxy group which is a cationically polymerizable group may have one or more kinds of radically polymerizable groups. As such a radically polymerizable group, a (meth)acryloyl group is preferable.

An preferred aspect of the curable compound having a radically polymerizable group and a cationically polymerizable group may be a compound represented by General Formula (1), having one alicyclic epoxy group (3,4-epoxycyclohexyl group) in one molecule thereof and one (meth)acryloyl group ((meth)acryloyloxy group) in one molecule thereof. The compound represented by General Formula (1) is preferably a compound represented by General Formula (1A).

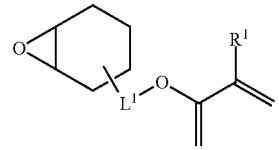

General Formula (1)

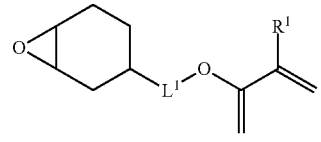

General Formula (1A)

In General Formula (1) and General Formula (1A), $R^1$ represents a hydrogen atom or a methyl group, and $L^1$ represents a divalent aliphatic hydrocarbon group having 1 to 3 carbon atoms, preferably represents an alkylene group having 1 to 3 carbon atoms, and more preferably represents a methylene group. The compound represented by General Formula (1) is preferably a compound represented by General Formula (1A), more preferably 3,4-epoxycyclohexylmethyl (meth)acrylate, and still more preferably 3,4-epoxycyclohexylmethyl methacrylate.

Moreover, the curable compound may be a polymer. In a case where the curable compound is the polymer, a preferred aspect of the repeating unit of the polymer may be a repeating unit represented by General Formula (1) in JP2016-035557A. The polymer may be a polymer which includes only one kind of repeating unit, that is, a homopolymer, or a polymer which includes two or more kinds of repeating units, that is, a copolymer. With regard to details and specific examples of the repeating unit represented by General Formula (1) in JP2016-035557A, reference can be made to paragraphs 0012 to 0019 of JP2016-035557A. Further, with regard to the curable compound which is a polymer having the repeating unit represented by General Formula (1) in JP2016-035557A, reference can also be made to paragraphs 0020 to 0028 of JP2016-035557A.

Furthermore, specific examples of the alicyclic epoxy compound also include the following compounds 2a to 2c.

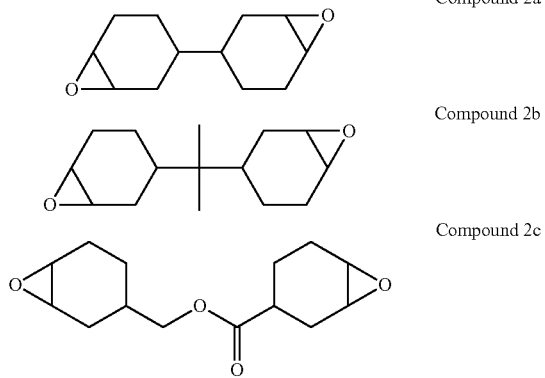

Compound 2a

Compound 2b

Compound 2c

The molecular weight of the curable compound may be, for example, in the range of 100 to 500 for a monomer, or the weight-average molecular weight may be in the range of 1,000 to 100,000 for a polymer. However, the molecular weights are not limited to the ranges.

The weight-average molecular weight refers to a weight-average molecular weight measured by gel permeation chromatography (GPC) in terms of polystyrene. Specific examples of the measurement conditions include the following measurement conditions.

GPC device: HLC-8120 (manufactured by Tosoh Corporation):

Column: TSKgel SuperHZM-H, TSKgel SuperHZ4000, TSKgel SuperHZ200 (manufactured by Tosoh Corporation)

The content of the curable compound in the curable composition is preferably 30% by mass or more, more preferably 50% by mass or more, and still more preferably 70% by mass or more, with respect to the total amount 100% by mass of the curable composition. Further, the content of the curable compound in the curable composition is preferably 98% by mass or less, more preferably 95% by mass or less, and still more preferably 90% by mass or less, with respect to the total amount 100% by mass of the curable composition. In the present invention and the present specification, one kind or two or more kinds of any components may be included. In a case where two or more kinds of the components are included, the content refers to a content of these two or more kinds of components.

(Polymerization Initiator)

The curable composition may include, but preferably includes, a polymerization initiator. As the polymerization initiator, either or both of a radical polymerization initiator and a cation polymerization initiator can be preferably used according to the types of the curable compound included in the curable composition. The radical polymerization initiator and the cation polymerization initiator may be each a photopolymerization initiator or a thermal polymerization initiator.

As the radical polymerization initiator, various polymerization initiators described in "The Latest UV Curing Technique" (p. 159; Publisher: Kazuhiro Takausu; Publishing company: Technical Information Institute Co., Ltd.; published in 1991), commercially available products described in a catalog of BASF, or the like can be used. As specific examples of commercially available products of the radical polymerization initiators, for example, alkylphenone-based photopolymerization initiators (IRGACURE 651, IRGACURE 184, DAROCURE 1173, IRGACURE 2959, IRGACURE 127, DAROCURE MBF, IRGACURE 907, IRGACURE 369, and IRGACURE 379EG, all manufactured by BASF), acylphosphine oxide-based photopolymerization initiators (IRGACURE 819 and LUCIRIN TPO, both manufactured by BASF), others (IRGACURE 784, IRGACURE OXE01, IRGACURE OXE02, and IRGACURE 754, all manufactured by BASF), or the like can be used.

Examples of the cation polymerization initiator include well-known compounds such as photoinitiators for photo-cationic polymerization, photo-decoloring agents for coloring agents, photo-discoloring agents, or well-known acid generators used for microresists and the like, and mixtures thereof.

Examples thereof include an onium salt compound, an organic halogen compound, and a disulfone compound.

Examples of the onium salt compound include a diazonium salt compound, an ammonium salt compound, an iminium salt compound, a phosphonium salt compound, an iodonium salt compound, a sulfonium salt compound, an arsonium salt compound, and a selenonium salt compound. Specific examples thereof include the compounds described in paragraphs 0058 and 0059 of JP2002-029162A.

Examples of the cation polymerization initiator that is particularly suitably used include onium salt compounds. As the cation polymerization initiator, a diazonium salt compound, an iodonium salt compound, a sulfonium salt compound, or an iminium salt compound is preferable in view of photosensitivity for photopolymerization initiation, material stability of compounds, or the like. Among these, the iodonium salt compound is the most preferable in view of light resistance.

Specific examples of the onium salt compounds that can be suitably used include the amylated sulfonium salt compound described in paragraph 0035 of JP1997-268205A (JP-H09-268205A), the diaryliodonium salt compound or the triarylsulfonium salt compound described in paragraphs 0010 and 0011 of JP2000-071366A, the sulfonium salt compound of a S-phenyl thiobenzoate ester described in paragraph 0017 of JP2001-288205A, and the onium salt compound described in paragraphs 0030 to 0033 of JP2001-133696A.

Other examples of the cation polymerization initiator include compounds such as organic metals and/or organic halides, a photoacid generator having an o-nitrobenzyl type protective group, and a compound that is photolyzed to generate sulfonic acid (iminosulfonate and the like) described in paragraphs 0059 to 0062 of JP2002-029162A.

Specific examples of the commercially available products of iodonium salt-based cation polymerization initiators include B2380 (manufactured by Tokyo Chemical Industry Co., Ltd.), BBI-102 (manufactured by Midori Kagaku Co., Ltd.), WPI-113 (manufactured by Wako Pure Chemical Industries, Ltd.), WPI-124 (manufactured by Wako Pure Chemical Industries, Ltd.), WPI-169 (manufactured by Wako Pure Chemical Industries, Ltd.), WPI-170 (manufactured by Wako Pure Chemical Industries, Ltd.), and DTBPI-PFBS (manufactured by Toyo Gosei Co., Ltd.).

From the viewpoint of satisfactorily progressing the curing reaction of the radically polymerizable group contained in the curable compound included in the curable composition, the content of the radical polymerization initiator in the curable composition is preferably in the range of 0.1% to 10.0% by mass, more preferably in the range of 1.0% to 5.0% by mass, and even more preferably in the range of 2.0% to 4.0% by mass, with respect to the total amount (100% by mass) of the solid content of the curable composition. The solid content refers to components excluding solvents of a composition.

From the viewpoints of satisfactorily progressing the curing reaction of the cationically polymerizable group contained in the curable compound included in the curable composition and of the stability of the curable composition, the content of the cation polymerization initiator in the curable composition is preferably in the range of 0.1% to 10.0% by mass, and more preferably in the range of 0.5% to 3.0% by mass, with respect to the total amount of the solid content (100% by mass) of the curable composition.

The radical polymerization initiator and the cation polymerization initiator may be used singly or in combination of two or more kinds thereof.

(Optional Components)

In addition to the above-described various components, the curable composition may contain one or more optional components. Specific examples of the optional components are described below. However, the optional components that can be included in the curable composition are not limited to the following specific examples, and in general, one or more of well-known additives that can be added to a cured layer called a hard coat may be included in an any amount.

—Solvent—

The curable composition may contain a solvent. The solvent is preferably selected from various well-known solvents, from the viewpoints of capability of dissolving or dispersing the respective components, capability of easily forming a uniform planar coating film in a coating step and a drying step, having good liquid preservability, and having a suitable saturated vapor pressure, and the like.

As the solvent, a mixed solvent obtained by mixing two or more solvents can also be used. From the viewpoint of reduction in a drying load, it is preferable that the mixed solvent includes a solvent having a boiling point of 100° C. or lower, and also includes a solvent having a boiling point higher than 100° C. for in order to adjust a drying rate. The boiling point means the boiling point at normal pressure and room temperature (101.33 kPa, 25° C.).

Examples of the solvent having a boiling point of 100° C. or lower include hydrocarbons such as hexane (boiling point 68.7° C.), heptane (98.4° C.), cyclohexane (80.7° C.), and benzene (80.1° C.), halogenated hydrocarbons such as dichloromethane (39.8° C.), chloroform (61.2° C.), carbon tetrachloride (76.8° C.), 1,2-dichloroethane (83.5° C.), and trichlorethylene (87.2° C.), ethers such as diethyl ether (34.6° C.), diisopropyl ether (68.5° C.), dipropyl ether (90.5° C.), and tetrahydrofuran (66° C.), esters such as ethyl formate (54.2° C.), methyl acetate (57.8° C.), ethyl acetate (77.1° C.), and isopropyl acetate (89.0° C.), ketones such as acetone (56.1° C.) and 2-butanone (also referred to as methyl ethyl ketone (MEK), 79.6° C.), alcohols such as methanol (64.5° C.), ethanol (78.3° C.), 2-propanol (82.4° C.), and 1-propanol (97.2° C.), cyano compounds such as acetonitrile (81.6° C.) and propionitrile (97.4° C.), and carbon disulfide (46.2° C.). Among these, ketones and esters are preferable, and ketones are still more preferable. Among ketones, 2-butanone (MEK) is particularly preferable. The curable composition preferably contains the solvent having a boiling point of 100° C. or lower in the amount of 30.0% to 80.0% by mass, and more preferably contains the solvent having a boiling point of 100° C. or lower in the amount of 50.0% to 70.0% by mass, with respect to the total amount (100.0% by mass) of the solvent.

Examples of the solvent having a boiling point higher than 100° C. include octane (125.7° C.), toluene (110.6° C.), xylene (138.0° C.), tetrachloroethylene (121.2° C.), chlorobenzene (131.7° C.), dioxane (101.3° C.), dibutyl ether (142.4° C.), isobutyl acetate (118.0° C.), cyclohexanone (155.7° C.), 2-methyl-4-pentanone (also referred to as methyl isobutyl ketone (MIBK), 115.9° C.) 1-butanol (117.7° C.), N,N-dimethylformamide (153.0° C.), N,N-dimethylacetamide (166.0° C.), and dimethyl sulfoxide (189.0° C.). The solvent is preferably cyclohexanone or 2-methyl-4-pentanone (MiBK). The curable composition preferably contains the solvent having a main boiling point higher than 100° C. by 10.0% to 60.0% by mass with respect to the total amount (100.0% by mass) of the solvent.

The concentration of the solid content in the curable composition, for example, is 30.0% to 70.0% by mass, but the present invention is not limited thereto.

(Surfactant)

The curable composition can also include a surfactant. As the surfactant, one or more well-known surfactants such as a fluorine-based surfactant and a silicon-based surfactant can be used. The surfactant can function as, for example, a leveling agent. Among these, the fluorine-based surfactant is preferable since it has an excellent effect of effectively suppressing the occurrence of coating unevenness, drying unevenness, and the like. With regard to details of the fluorine-based surfactant that is preferably used, reference can be made to paragraphs 0064 to 0072 of JP2015-004979A. The content of the surfactant in the curable composition is not particularly limited, and a suitable amount of a surfactant may be included in the curable composition such that occurrence of coating unevenness, drying unevenness, and the like can be suppressed.

<Substrate Film>

The laminated film according to an aspect of the present invention has a substrate film and a cured layer obtained by curing the curable composition. As the substrate film, a resin film excellent in optical performance, transparency, mechanical strength, heat stability, isotropy, and the like is preferable, and a transparent resin film is more preferable. The expression "transparent" in the present invention and the present specification means that the transmittance of visible light is 60% or more, preferably 80% or more, and more preferably 90% or more.

Examples of the resin included in the resin film include a polycarbonate resin, a polyester resin such as polyethylene terephthalate and polyethylene naphthalate, a (meth)acrylic resin such as polymethyl methacrylate, and a styrene resin such as polystyrene and an acrylonitrile-styrene copolymer (acrylonitrile-styrene (AS) resin). Examples thereof include polyolefin such as polyethylene and polypropylene, a polyolefin resin such as an ethylene-propylene copolymer, a vinyl chloride resin, an amide resin such as nylon and aromatic polyamide, an imide resin, a sulfone resin, a polyethersulfone resin, a polyether ether ketone resin, a polyphenylene sulfide resin, a vinylidene chloride resin, a vinyl butyral resin, an allylate resin, a polyoxymethylene resin, an epoxy resin, and a resin obtained by mixing the above resins. In addition, the substrate film may be a film obtained by laminating two or more layers of the resin films.

As the substrate film, a cellulose resin film represented by triacetyl cellulose which is widely used as a protective film of a polarizing plate is preferable, and a cellulose acylate film is more preferable. In addition, as the substrate film, an acrylic resin film which has recently been proposed to be used as a protective film of a polarizing plate is also preferable.

The thickness (total thickness in a case where the substrate film is a film obtained by laminating two or more layers of resin films) of the substrate film, for example, can be approximately 10 µm to 1,000 µm, preferably in the range of 10 µm to 80 µm, and more preferably in the range of 15 µm to 40 µm. A reduced thickness of the substrate film is preferable from the viewpoint of reducing the thickness of a laminated film including the substrate film. Reduction in the thickness of the laminated film is preferable since the thickness of devices or articles to which the laminated film is incorporated, for example, an image display device and a polarizing plate, can be reduced.

With respect to additives that can be included in the resin film for used as a substrate film, reference can be made to paragraphs 0024 to 0052 and 0073 to 0216 of JP2014-210905A.

<Haze>

In general, the anti-glare film is a film exhibiting a haze of more than 1.0%. In contrast, the haze of the laminated film is 1.0% or less. The haze of the laminated film is preferably 0.8% or less, more preferably 0.6% or less, still more preferably 0.4% or less, even still more preferably 0.3% or less, and particularly preferably less than 0.3%. The haze of the laminated film is, for example at least 0.1%. However, the haze may be less than the value. It should be noted that the haze and the white turbidity to be evaluated in Examples which will be described later do not necessarily correlate.

<Configuration of Laminated Film>

The laminated film according to an aspect of the present invention has at least a substrate film and a cured layer obtained by curing the curable composition. The simplest configuration thereof is a laminated film including a substrate film and the cured layer formed directly on the substrate film. Other configurations may include a configuration in which one or more layers are further included on the cured layer formed on a substrate film, a configuration in which one or more layers are included between a substrate film and the cured layer, and a configuration in which one or more layers are included on the side opposite to the side of the substrate film, having the cured layer. To other layers that may be optionally included, well-known techniques can be applied without any limitation. A particularly preferred configuration is one in which either or both of the outermost layers of the laminated film is the cured layer.

[Method for Producing Laminated Film]

The laminated film according to an aspect of the present invention can be produced by forming a cured layer obtained by curing the curable composition on a substrate film through a step of applying the curable composition onto the substrate film and a step of curing the applied curable composition. The curable composition may be directly applied onto the substrate film or onto one or more other layers provided on the substrate film. The curing step may be carried out by heating or by light irradiation, depending on the types of components in the curable composition. Examples of light irradiated so as to perform a curing reaction carried out by light irradiation include X-rays, electron beams, ultraviolet rays, visible light, and infrared rays, and generally, ultraviolet rays are widely used. The "ultraviolet rays" in the present invention and the present specification refers to light having a wavelength of 190 to 400 nm.

Hereinbelow, specific aspects of the method for producing the laminated film will be described.

(Preparation of Curable Composition)

The curable composition for use in the formation of the cured layer can be prepared by mixing:

silica particles having a hydrophobic group on the surface thereof and an average primary particle diameter of 5 to 50 nm;

silica particles having a hydrophobic group on the surface thereof and an average primary particle diameter of 7 to 50 nm; and a curable compound. With regard to the respective components, details are as described above. The mixing ratio of the silica particles having a hydrophobic group on the surface thereof and an average primary particle diameter of 5 to 50 nm to the silica particles having a hydrophobic group on the surface thereof and an average primary particle diameter of 7 to 50 nm is preferably 0.005 to 0.400, and more preferably in the range of 0.010 to 0.100, in terms of "the former/the latter".

Preferred examples of the method for preparing the curable composition include a method including a step of dispersing silica particles having a hydrophobic group on the surface thereof and an average primary particle diameter of 5 to 50 nm in an organic solvent to prepare a silica particle-containing composition 1, and a step of mixing the silica particle-containing composition 1 with a silica particle-containing composition 2 including silica particles having a hydrophobic group on the surface thereof and an average primary particle diameter of 7 to 50 nm in an organic solvent, and a curable compound. The preparation method is a preferred method since a cured layer including the silica particles A and the silica particles B in the above-described state. The silica particles included in the silica particle-containing composition 1 can be present as the silica particles A in the cured layer formed. On the other hand, the silica particles included in the silica particle-containing composition 2 can be present as the silica particles B in the cured layer formed. Details on the silica particles included in the silica particle-containing composition 1 and the silica particles included in the silica particle-containing composition 2 are each the same as described above for the silica particles included in the curable composition.

The silica particle-containing composition 1 can be prepared by dispersing silica particles having a hydrophobic group on the surface thereof and an average primary particle diameter of 5 to 50 nm in an organic solvent. The dispersion treatment can be carried out by a well-known dispersion method such as ultrasonic dispersion. It is preferable that the silica particles having a hydrophobic group on the surface thereof and an average primary particle diameter of 5 to 50 nm are included in the state where the average secondary particle diameter is in the range of 100 to 500 nm, in the silica particle-containing composition 1 by the dispersion treatment. This point is preferable since a cured layer in which the silica particles having a hydrophobic group on the surface thereof and an average primary particle diameter of 5 to 50 nm are included in the presence state of the silica particles A is easily formed. The average secondary particle diameter is more preferably in the range of 150 to 400 nm. The dispersion conditions such as a dispersion time are not particularly limited, and are preferably adjusted so as to obtain a composition in which silica particles having a hydrophobic group on the surface thereof and an average primary particle diameter of 5 to 50 nm are dispersed with the preferred average secondary particle diameter are dispersed.

As the silica particle-containing composition 2, for example, a commercially available silica particle-containing composition (for example, a commercially available colloidal silica dispersion liquid) can be used as it is or after optional addition of an organic solvent. In the silica particle-containing composition 2, the silica particles having a hydrophobic group on the surface thereof and an average primary particle diameter of 10 to 50 nm are particularly preferably dispersed in the primary particle state. In view that such a silica particle-containing composition 2 can be easily prepared, it is preferable that the silica particles having a hydrophobic group on the surface thereof and an average primary particle diameter of 7 to 50 nm are colloidal silica.

The mixing order of the silica colloid particle-containing composition 1, the silica colloid particle-containing composition 2, and the curable composition is not limited, and the components may be mixed simultaneously or sequentially in any order. In addition, the components that are optionally included in the curable composition may be added in any step.

(Coating Step)

As a method for coating the curable composition onto a substrate film directly or via another layer, a well-known coating method can be used. Specific examples of the coating method include well-known coating methods such as a dip coating method, an air knife coating method, a curtain coating method, a roller coating method, a die coating method, a wire bar coating method, and a gravure coating method. Depending on the coating amount of the curable composition to be applied onto the substrate film, the film thickness of the cured layer to be formed can be adjusted.

(Drying Step)

The curable composition applied onto the substrate film is preferably cured through a drying step. The drying step can be carried out by any combination of one or two or more of drying methods such as a method of disposing a substrate film on which the curable composition has been applied in a heating atmosphere, a method of transporting the film in a heating atmosphere, and a method of blowing hot air onto the surface of the coated curable composition. The atmosphere temperature of the dry atmosphere and the temperature of the warm air are not particularly limited as long as the temperatures are temperatures at which the curable composition can be dried. In addition, the drying step may be carried out after curing the curable composition, and may also be carried out before and after the curing.

(Curing Step)

The curable composition applied onto the substrate film is subjected to a curing treatment depending on the types of the curable composition included in the composition. The curing treatment can be carried out by light irradiation and/or heating. The conditions for light irradiation and heating may be set according to the types and the contents of the components included in the curable composition such that the curing reaction of the curable composition proceeds properly. For example, light irradiation can be carried out using various light sources capable of irradiating ultraviolet rays, for example, a high-pressure mercury lamp, an ultra-high-pressure mercury lamp, a carbon arc lamp, a metal halide lamp, a xenon lamp, a chemical lamp, an electrodeless discharge lamp, a light emitting diode (LED), or and the like. The light irradiation dose is usually in the range of 10 to 3,000 $mJ/cm^2$, and preferably in the range of 20 to 1,500 $mJ/cm^2$. The light irradiation dose can be adjusted by the output of the light source and the illuminance. The light irradiation is preferably carried out under a nitrogen purge, and more preferably carried out at an oxygen concentration of 0.1% by volume or less.

(Processing of Laminated Film)

The laminated film having the cured layer formed on the substrate film can be processed into shapes depending on applications thereof, and can be used in various applications. Examples of the processing include winding up a laminated film thus produced, thereby forming a roll-shaped film. Further, the examples also include punching into shapes depending on applications by a punching machine.

As described above, according to an aspect of the present invention, a method for producing the laminated film, the method including:

a step of dispersing silica particles having a hydrophobic group on the surface thereof and an average primary particle diameter of 5 to 50 nm in an organic solvent to prepare a silica particle-containing composition 1;

a step of mixing the silica particle-containing composition 1 with a silica particle-containing composition 2 including silica particles having a hydrophobic group on the surface thereof and an average primary particle diameter of 7 to 50 nm in an organic solvent, and a curable compound to prepare a curable composition;

a step of applying the curable composition onto a substrate film; and a step of curing the applied curable composition is also provided.

The laminated film according to an aspect of the present invention can exhibit excellent anti-blocking properties. Such excellent anti-blocking properties that make the bonding between the surface of the laminated film hardly bonded and another surface of the film hardly occur is preferable from the viewpoint of easiness in handling during or after the processing. Further, excellent anti-blocking properties are preferable from the viewpoint of easiness in production and handling of an article including the laminated film. Specific aspects of the article including the laminated film will be described later.

[Polarizing Plate]

An aspect of the present invention relates to a polarizing plate including a polarizer and the laminated film. The laminated film can function as a protective film (protective film for a polarizing plate) that protects the polarizer. Further, in general, the liquid crystal display includes a front plate on the viewer side from the display device, but the laminated film serving as the protective film for a polarizing plate may also serve as the front plate or may be included a front plate as another member.

As the polarizing plate, a polarizing plate having a configuration in which a polarizer layer (also referred to as a polarizing film or a polarizer layer) is positioned between two protective films for a polarizing plate (simply also referred to as a "protective film") is widely used currently. The polarizing plate according to an aspect of the present invention can also be a polarizing plate having the configuration. Among the two protective films for a polarizing plate included in the polarizing plate, the protective film for a polarizing plate positioned on the liquid crystal display element side in a case of being incorporated in the liquid crystal display is referred to as an "inner side protective film", and the other protective film for a polarizing plate is referred to as an "outer side protective film". The laminated film according to an aspect of the present invention may be used as an inner side protective film and may also be used as an outer side protective film. From the viewpoint of the protection of the polarizing plate and the liquid crystal display element, it is preferable that the laminated film is disposed such that the cured layer becomes the outermost layer of the polarizing plate.

Moreover, the polarizing plate may be used as a front-side polarizing plate or may be used as a rear-side polarizing plate, and it is preferable to use the polarizing plate as at least a front-side polarizing plate. The "front-side polarizing plate" is a polarizing plate positioned on the viewer side among the two polarizing plates in a case where the liquid crystal panel is incorporated in the liquid crystal display together with the backlight unit, and the "rear-side polarizing plate" is a polarizing plate positioned on a backlight unit side.

The polarizing plate may include the laminated film according to an aspect of the present invention as one protective film and another film as the other protective film. Examples of other films include a cellulose acetate film which is generally used as a protective film for a polarizing plate. As another film, for example, a cellulose acetate film that is produced by a solution casting method and stretched in the width direction in a roll film form at a stretching ratio of 10% to 100% can be used.

Moreover, examples of another film to be used as the other protective film include an optical compensation film having an optical compensation layer including an optically anisotropic layer. According to the optical compensation film (also referred to as a phase difference film), in the liquid crystal display, the viewing angle characteristics of the screen can be improved. As the optical compensation film, a well-known optical compensation film can be used. In view of widening an angle of view, the optical compensation film described in JP2001-100042A is preferable.

The polarizer may be a so-called linear polarizer having a function of converting natural light into specific linearly polarized light. The polarizer is not particularly limited, but an absorptive polarizer can be used. As the absorptive polarizer, a generally used polarizer can be used, for example, all of an iodine-based polarizer, a dye-based polarizer using a dichroic dye, a polyene-based polarizer, and a polarizer using a wire grid can be used. An iodine-based polarizer and a dye-based polarizer can generally be manufactured by causing iodine or a dichroic dye to be adsorbed in a polyvinyl alcohol-based film and stretching the film. A preferred aspect of the polarizer may be an iodine-dyed polyvinyl alcohol-based film. The thickness of the polarizer is not particularly limited but may be, for example, from 0.1 µm to 50 µm. Form the viewpoint of making the polarizing plate thinner, the thickness of the polarizer layer is preferably 30 µm or less, and more preferably 20 µm or less.

In addition, the polarizer may be a so-called coating-type polarizer. With regard to the coating-type polarizer, paragraphs 0052 and 0053 of JP2014-170202A can be referred to.

The laminated film used as a polarizer and a protective film can be bonded by a well-known method, for example, by using an adhesive. In the present invention and the present specification, an adhesive also includes an adhesive agent.

[Liquid Crystal Panel]

An aspect of the present invention relates to a liquid crystal panel including a liquid crystal display element and the polarizing plate. For example, an aspect of the present invention relates to a liquid crystal panel including a front-side polarizing plate, a liquid crystal display element, and a rear-side polarizing plate, in which the front-side polarizing plate is a laminated film according to an aspect of the present invention. The rear-side polarizing plate may also be a polarizing plate including the laminated film according to an aspect of the present invention. The polarizing plate and the liquid crystal display element can be bonded by a well-known method, for example, using an adhesive.

Examples of the liquid crystal display element include a twisted nematic (TN) type, a super-twisted nematic (STN) type, a triple super twisted nematic (TSTN) type, a multi-domain type, a vertical alignment (VA) type, an in plane switching (IPS) type, and an optically compensated bend (OCB) type. The liquid crystal display element generally has a configuration in which a liquid crystal layer is disposed between two glass substrates.

Examples of the liquid crystal display element include an in-cell touch panel liquid crystal element and an on-cell touch panel liquid crystal display element, in which a touch panel function is incorporated into any type of the above liquid crystal display elements. Other examples of the liquid crystal display element include a form in which a film type touch sensor is bonded to a liquid crystal display element.

The in-cell touch panel liquid crystal display element may be an in-cell touch panel liquid crystal display element in which a touch panel function of a resistive film type, a capacitive type, an optical type, or the like is incorporated inside the liquid crystal display element in which a liquid crystal layer is interposed between two glass substrates. With regard to the in-cell touch panel liquid crystal display element, for example, well-known techniques in JP2011-076602A, JP2011-222009A, or the like can be applied without limitation.

The on-cell touch panel liquid crystal display element can be preferably an on-cell touch panel liquid crystal display element in which a touch panel function of a resistive film type, a capacitive type, an optical type, or the like is incorporated between glass substrates with a liquid crystal layer interposed therebetween and a polarizing plate. The on-cell touch panel liquid crystal display element is described, for example, in JP2012-088683A.

[Liquid Crystal Display]

An aspect of the present invention relates to a liquid crystal display including the liquid crystal panel described above and a backlight unit.

Details of the liquid crystal panel are as described above.

The backlight unit included in the liquid crystal display is not particularly limited, and may be an edge light type backlight unit or may be a downright backlight unit. The backlight unit may include at least a light source and one or more well-known members such as a diffusion plate, a reflection plate, a light guide plate, a brightness enhancement film, and a prism sheet.

The aspect in which the laminated film according to an aspect of the present invention is applied to a liquid crystal display has been described above. However, the laminated film according to an aspect of the present invention can be used instead of a film included as a so-called hard coat film in various image display devices other than the liquid crystal display. Examples of the image display device include a cathode ray tube (CRT), a plasma display panel (PDP), an electroluminescence display (ELD), a vacuum fluorescent display (VFD), and a field emission display (FED). The laminated film according to an aspect of the present invention can be used, for example, as a member disposed on the most viewer side of the image display device, and the cured layer included in the laminated film is preferably disposed in the outermost layer of the image display device.

[Touch Panel]

An aspect of the present invention relates to a touch panel including the laminated film. An aspect of such a touch panel may be a liquid crystal panel including the in-cell touch panel liquid crystal element, the on-cell touch panel liquid crystal display element, or a liquid crystal display element having a film type touch sensor bonded thereto.

Another aspect of the touch panel may be a touch panel in which a touch sensor film is positioned on the side opposite to the side having the cured layer of the substrate film in the laminated film. With regard to a preferred aspect of the touch sensor film, reference can be made to paragraphs 0016 to 0042 of JP2012-206307A.

Still another aspect of the touch panel may be a resistive film type touch panel including the laminated film on the front plate. The resistive film type touch panel is formed in a basic configuration in which electrically conductive films of a pair of upper and lower substrates having an electrically conductive layer are disposed to face each other via a spacer. The configuration of the resistance film type touch panel is well-known, and can be applied to the present invention without any limitation of well-known techniques.

Still another aspect of the touch panel may be a capacitive type touch panel including the laminated film on the front plate. Examples of the capacitive type touch panel include a surface capacitive type touch panel and a projected capacitive type touch panel. The projected capacitive type touch panel is formed in a basic configuration in which an X-axis electrode and a Y-axis electrode perpendicular to the X electrode are disposed via an insulator. Specific aspects thereof include an aspect in which an X electrode and a Y electrode are formed on each different surfaces on one substrate, an aspect in which an X electrode, an insulator layer, and a Y electrode are formed in this order on one substrate, and an aspect in which an X electrode is formed on one substrate and a Y electrode is formed on another substrate (in this aspect, the configuration for bonding two substrates is a basic configuration). The configuration of the capacitive type touch panel is well-known, and in the present invention, well-known techniques can be applied without any limitation.

In an aspect of the front plate and the touch panel, the cured layer included in the laminated film is positioned in the outermost layer, and the outermost surface is the surface of the cured layer. In addition, the front plate can be the polarizing plate according to an aspect of the present invention (that is, a polarizing plate which also serves as a front plate).

EXAMPLES

Hereinafter, the present invention is specifically described with reference to examples. Materials, reagents, substance amounts and proportions thereof, operations, and the like shown in Examples below can be appropriately modified without departing from the gist of the present invention. Therefore, the scope of the present invention is not limited to the following specific examples. Hereinafter, "%" means "% by mass" unless otherwise specified.

Various components used in Examples and Comparative Examples are as follows.

<Curable Compound>

DPHA: Mixture of dipentaerythritol pentaacrylate and dipentaerythritol hexaacrylate (KAYARAD DPHA manufactured by Nippon Kayaku Co., Ltd.)

CELLOXIDE 2021P (Compound 2c as described above): Bifunctional alicyclic epoxy compound (manufactured by Daicel Corporation)

CYCLOMER M100 (3,4-Epoxycyclohexylmethyl methacrylate): Methacryloyl group-containing, monofunctional alicyclic epoxy compound (manufactured by Daicel Corporation)

<Polymerization Initiator (Photopolymerization Initiator)>

Radical polymerization initiator: IRGACURE 184 manufactured by BASF

Cation polymerization initiator: Bis(4-tert-butylphenyl) iodonium hexafluorophosphate (manufactured by Tokyo Chemical Industry Co., Ltd.)

<Silica Particles a>

The silica particles a described in Table 5 or 6 below are surface-hydrophobicized fumed silica manufactured by Nippon Aerosil Co., Ltd., and details thereof are presented in Table 1. The surface hydrophobic groups presented in Table 1 are all hydrophobic groups having a solubility parameter in the range of 10.0 to 30.0. As an example, the solubility parameter of the trimethylsilyl group is 13.2, the solubility parameter of the octylsilyl group is 17.1, and the solubility parameter of the dimethylsilyl group is 13.8.

TABLE 1

| Trade name (manufactured by Nippon Aerosil Co., Ltd.) | Average primary particle diameter (nm) | Surface hydrophobic group | BET Specific surface area ($m^2/g$) | Carbon content (%) | Carbon content/BET specific surface area |
|---|---|---|---|---|---|
| AEROSIL R805 | 12 | Octylsilyl group | 150 | 5.5 | 0.037 |
| AEROSIL R976S | 7 | Dimethylsilyl group | 240 | 2.2 | 0.009 |
| AEROSIL R104 | 12 | Silicon-containing group incorporated with particles surface-treated with octamethylcyclotetrasiloxane | 150 | 1.5 | 0.010 |
| AEROSIL RX50 | 40 | Trimethylsilyl group | 35 | 0.8 | 0.021 |
| AEROSIL NX90G | 20 | Trimethylsilyl group | 65 | 1.1 | 0.017 |
| AEROSIL RX200 | 12 | Trimethylsilyl group | 140 | 2.5 | 0.018 |
| AEROSIL RX300 | 7 | Trimethylsilyl group | 210 | 3.8 | 0.018 |
| AEROSIL R812 | 7 | Trimethylsilyl group | 260 | 2.5 | 0.010 |
| AEROSIL RA200H | 12 | Trimethylsilyl group + aminosilyl group | 150 | 3.3 | 0.022 |
| AEROSIL RY200 | 12 | Silicon-containing group incorporated with particles surface-treated with silicone oil | 100 | 5.3 | 0.053 |
| AEROSIL R711 | 12 | Methacryloxysilyl group | 150 | 5.5 | 0.037 |

<Silica Particles b>

The silica particles a described in Table 5 or 6 below are colloidal silica (methyl ethyl ketone dispersion liquid) manufactured by Nissan Chemical Industries, Ltd., and details thereof are presented in Table 2. The surface hydrophobic groups presented in Table 2 are all hydrophobic groups having a solubility parameter in the range of 10.0 to 30.0.

TABLE 2

| Trade name (manufactured by Nissan Chemical Industries, Ltd.) | Average primary particle diameter | Surface hydrophobic group | Note |
|---|---|---|---|
| MEK-ST | 12 nm | Alkylsilyl group | MEK dispersion liquid |
| MEK-EC-2130Y | 12 nm | Alkylsilyl group | MEK dispersion liquid |
| MEK-AC-2140Z | 12 nm | (Meth)acryloxysilyl group | MEK dispersion liquid |
| MEK-AC-4130Z | 45 nm | (Meth)acryloxysilyl group | MEK dispersion liquid |

<Other Particles>

Other silica particles a described in Table 5 or 6 below are commercially available silica particles, and details thereof are presented in Tables 3 and 4. In Table 3, "IPA" is isopropyl alcohol (2-propanol). The particles described in Table 4 are commercially available fumed silica which has not been subjected to a surface hydrophobization treatment.

TABLE 3

| Trade name | Average primary particle diameter | Surface hydrophobic group | Note |
|---|---|---|---|
| OSCAL 1432M manufactured by Nikki Shokubai Kasei Co., Ltd. | 12 nm | None | IPA dispersion liquid |
| SNOWTEX ST-30 manufactured by Nissan Chemical Industries, Ltd. | 12 nm | None | Aqueous dispersion Liquid |
| MEK-ST ZL manufactured by Nissan Chemical Industries, Ltd. | 70 to 100 nm | (Meth)acryloxysilyl group | MEK dispersion liquid |

TABLE 4

| Trade name | Average primary particle diameter | Surface hydrophobic group | BET specific surface area (m²/g) | Carbon content (%) | Carbon content/BET specific surface area |
|---|---|---|---|---|---|
| AEROSIL 300 manufactured by Nippon Aerosil Co., Ltd. | 7 nm | None | 300 | 0 | 0.000 |

<Surfactant>
FP-1: The following fluorine-containing compound (fluorine-based surfactant)

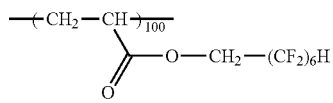

<Preparation of Silica Particle-Containing Composition 1 (Dispersion Liquid of Silica Particles a)>

The silica particles a were added to MiBK such that the concentration of the solid content reached 5%, and stirred with a magnetic stirrer for 30 minutes. Thereafter, the mixture was subjected to ultrasonic dispersion with an ultrasonic dispersing machine (Ultrasonic Homogenizer UH-600S manufactured by SMT Co., Ltd.) for 10 minutes to manufacture a dispersion liquid of the silica particles a.

A part of the obtained dispersion liquid was taken as a sample for measuring an average secondary particle diameter, and the average secondary particle diameter of the silica particles a in the dispersion liquid was measured using Microtrac MT3000 (manufactured by Microtrac Bell Corp.). The measurement results are presented in Tables 5 and 6 below.

<Silica Particle-Containing Composition 2 (Dispersion Liquid of Silica Particles b)>

As the dispersion liquid of the silica particles b, the commercially available MEK dispersion liquid described in Table 2 was used.

<Dispersion Liquid of Other Particles>

As the dispersion liquid of other particles presented in Table 3, the commercially available dispersion liquids described in Table 3 were used.

The dispersion liquid of other particles presented in Table 4 were prepared by the same method as for the dispersion liquid of the silica particles a.

<Preparation of Curable Compositions A1 to A29>

The respective components of a solvent (MEK and MiBK), a curable compound, a polymerization initiator, a dispersion liquid of the silica particles a, a dispersion liquid of the silica particles b, and a surfactant were added in this order at a composition presented in Table 5 or 6 below, and filtered through a polypropylene-made filter having a pore diameter of 10 μm to prepare each of curable compositions.

However, a curable composition including the other particles instead of the silica particles a was prepared by adding the respective components of a solvent (MEK and MiBK), a curable compound, a polymerization initiator, a dispersion liquid of the other particles, a dispersion liquid of the silica particles b, and a surfactant in this order.

A curable composition including the other particles instead of the silica particles b was prepared by adding the respective components of a solvent (MEK and MiBK), a curable compound, a polymerization initiator, a dispersion liquid of the silica particles a, a dispersion liquid of the other particles, and a surfactant in this order.

A curable composition A12 was prepared using the silica particles a in the powder state, not a dispersion liquid, and adding the respective components of a curable compound, a polymerization initiator, the silica particles a (powder), a dispersion liquid of the silica particles b, and a surfactant in this order.

The numerical values of the contents of the respective components in Tables 5 and 6 represent % by mass of the solid contents (components excluding the solvent) of the respective components with respect to the total amount 100% by mass of the solid content of the prepared curable composition. Further, the amount of the solvent to be added was adjusted such that the concentration of the solid content of the curable composition reached 50% by mass, and the proportions of MEK and MiBK in the total solvent included in the curable composition reached 50% and 50%, respectively.

<Manufacture of Laminated Films S1 to S29>

A triacetyl cellulose film having a thickness of 25 μm was wound in a roll shape, and using the respective curable compositions presented in Tables 5 and 6, the coating amounts of the curable compositions were adjusted such that the thickness of the formed cured layer reached the values presented in Tables 5 and 6, thereby manufacturing laminated films S1 to S29. Specifically, the respective curable compositions were applied onto the surface of the triacetyl cellulose film under the conditions of a transportation speed of 30 m/minute by a die coating method using a slot die described in Example 1 of JP2006-122889A, and dried at an atmosphere temperature of 60° C. for 150 seconds. Thereafter, the curable compositions were irradiated with ultraviolet rays at an illuminance of 200 mW/cm² and an irradiation dose of 500 mJ/cm², using an air cooling metal halide lamp (manufactured by Eye Graphics Co., Ltd.) of 160 W/cm at an oxygen concentration of about 0.1% by volume under a nitrogen purge, and the curable compositions were cured to form cured layers, which were then wound.

By the above method, the respective laminated films of Examples and Comparative Examples were manufactured.

<Evaluation of Laminated Film>

(1) Evaluation of Presence State of Particles in Cured Layer (Identification of Silica Particles A and Silica Particles B, and Measurement of Occupied Area Proportion and Variation Coefficient of Occupied Area Proportion Thereof)

A sample (ultrathin sliced piece) for observing a cross-section having a thickness of about 50 nm was cut from each of the laminated films of Examples and Comparative Examples, using a microtome. Using this sample for observing a cross-section, a cross-sectional TEM image was acquired with a transmission electron microscope by the above-described method, and a binarized image was obtained by the above-described method. In the obtained binarized image, the particles were classified into silica particles A and silica particles B by the above-described method. The silica particles A were observed as a continuous black portion with a length of 100 nm or more (in the range of 100 to 3,000 nm). From the aggregation state and the dispersion state of the particles on the cross-sectional TEM image in the cured layer, it was found that the silica particles a were observed as silica particles A and the silica particles b were observed as silica particles B. Accordingly, the average primary particle diameter of the silica particles A is an average primary particle diameter of the silica particles a presented in Table 1, and the hydrophobic groups contained in the silica particles A are hydrophobic groups contained in the silica particles a presented in Table 1. The average primary particle diameter of the silica particles B is an average primary particle diameter of the silica particles b presented in Table 2, the hydrophobic groups contained in the silica particles B are hydrophobic groups contained in the silica particles b presented in Table 2.

Using the cross-sectional TEM image, for the silica particles A and the silica particles B, the occupied area proportion and the variation coefficient of the occupied area proportion were also determined by the above-described method. In the same manner, for the other particles, the variation coefficient of the occupied area proportion was determined.

(2) Measurement of Haze of Laminated Film

The haze of each of the laminated films of Examples and Comparative Examples was measured using a haze meter (manufactured by Nippon Denshoku Industries Co., Ltd. haze meter NDH2000) by the above-described method.

(3) Surface Shape of Cured Layer

On the surface of the cured layer of each of the laminated films of Examples and Comparative Examples, the total amplitude and the maximum height St were measured at a wavelength of 2.50 to 5.00 μm of an unevenness profile by the above-described method at a lens magnification of 10× in a phase mode, using a non-contact type surface-layer cross-sectional shape measuring system VertScan 2.0 manufactured by Mitsubishi Chemical Systems, Inc.

(4) Anti-Blocking Properties

For each of the laminated films of Examples and Comparative Examples, the bonding properties in the mutual bonding of the surfaces of the cured layer of the laminated film were evaluated according to the following standard. The bonded film is the same as in Examples or Comparative Examples. For example, the laminated film S1 was bonded to two laminated films S1. By performing evaluations after the mutual bonding of the laminated films of Examples or Comparative Examples as above, evaluation can be performed more accurately while the anti-blocking properties of the laminated film are not affected by the physical properties of other surfaces to be bonded, as compared with a case where anti-blocking properties are evaluated after bonding to other surfaces.

A: There is no bonding feeling at all.
B: There is substantially no bonding feeling.
C: There is strong bonding feeling.

(5) White Turbidity

For each of the laminated films of Examples and Comparative Examples, an oily black ink was applied onto a surface on the side opposite to the surface of the cured layer (onto the surface of the triacetylcellulose film side) to prepare an A4-sized sample which had been prevented from light reflection on the surface on the side opposite to the surface of the cured layer. The sample was irradiated with light from a tungsten light source while blocking light in a room where the surroundings were all black, and observed with naked eyes to evaluate the presence and the extent of white turbidity on the following standard.

A: A whitish point is not found on the surface of the cured layer even with careful observation.
B: The surface of the cured layer is slightly whitish with careful observation. However, the cured layer is acceptable as a product film.
C: The surface of the cured layer is whitish.

(6) Hardness

On the surface of the cured layer of each of the laminated films of Examples and Comparative Examples, pencil hardness evaluation described in JIS K 5400 was performed. The laminated films were humidified in an environment at an atmosphere temperature of 25° C. and a relative humidity of 60% for 2 hours, and then measured five times (n=5) while changing the measurement points on the same surface of the cured layer of the laminated film under a load of 6.0 N, using 2H to 5H pencils for a test specified in JIS S 6006 so as to determine the surface hardness according to the following evaluation standard.

OK: In three or more out of five evaluations, there was no clearly perceivable scratch.
NG: In twice or less out of five evaluations, there was no clearly perceivable scratch.

From the results obtained by the determination, the hardness was evaluated according to the following standard.

A: The evaluation result using the 3H pencil for a test is determined as OK.
B: The evaluation result using the 2H pencil for a test is determined as OK, and the evaluation result using the 3H pencil for a test is determined as NG.
C: The evaluation result using the 2H pencil for a test is determined as NG.

(6) Scratch Resistance (Steel Wool Scratch Resistance)

Under a load of 500 g or 700 g, steel wool (#0000 BOMSTAR manufactured by Nippon Steel Wool Co., Ltd.) was reciprocated 50 times on the surface of the cured layer of each of the laminated films of Examples and Comparative Examples. Thereafter, the surface of the cured layer was visually observed. According to the loads under which scratches occurring in the stripe shape were observed, and the scratch resistance was evaluated in accordance with the following standard.

A: Scratch is not observed under a load of 700 g.
B: Scratch is observed under a load of 700 g, but scratch is not observed under a load of 500 g.
C: Scratch is observed under a load of 500 g.

The above results are presented in Tables 5 and 6.

TABLE 5

| | | | A1 | A2 | A3 | A4 | A5 | A6 | A7 | A8 | A9 | A10 | A11 | A12 |
|---|---|---|---|---|---|---|---|---|---|---|---|---|---|---|
| Curable compound | | DPHA | 95.9% | 96.6% | 81.9% | 80.9% | 61.9% | 61.6% | 95.4% | 96.9% | 80.9% | 80.9% | 80.9% | 80.9% |
| | | CELLOXIDE 2021P | | | | | | | | | | | | |
| | | CYCLOMER M100 | | | | | | | | | | | | |
| Polymerization initiator | | Radical polymerization initiator | 3.0% | 3.0% | 3.0% | 3.0% | 3.0% | 3.0% | 3.0% | 3.0% | 3.0% | 3.0% | 3.0% | 3.0% |
| | | Cation polymerization initiator | | | | | | | | | | | | |
| Silica particles a | | AEROSIL R805 | 1.0% | 0.3% | | 1.0% | 5.0% | 0.3% | 1.0% | | 1.0% | 1.0% | 1.0% | 1.0% |
| | | AEROSIL R976S | | | | | | | | | | | | |
| | | AEROSIL R104 | | | | | | | | | | | | |
| | | AEROSIL RX50 | | | | | | | | | | | | |
| | | AEROSIL NX90G | | | | | | | | | | | | |
| | | AEROSIL RX200 | | | | | | | | | | | | |
| | | AEROSIL RX300 | | | | | | | | | | | | |
| | | AEROSIL R812 | | | | | | | | | | | | |
| | | AEROSIL RA200H | | | | | | | | | | | | |
| | | AEROSIL RY200 | | | | | | | | | | | | |
| | | AEROSIL R711 | | | | | | | | | | | | |
| Silica particles b | | MEK-ST | | | 15.0% | 15.0% | 30.0% | 35.0% | 0.5% | 15% | | | | 15.0% |
| | | MEK-EC-2130Y | | | | | | | | | 15.0% | | | |
| | | MEK-AC-2140Z | | | | | | | | | | 15.0% | | |
| | | MEK-AC-4130Z | | | | | | | | | | | 15.0% | |
| Content of silica particles a/content of silica particles b | | | 0.000 | 0.000 | — | 0.067 | 0.167 | 0.009 | 2.000 | — | — | — | — | 0.067 |
| Other particles | | OSCAL 1432M | | | | | | | | 0.7% | | | | |
| | | SNOWTEX ST-30 | | | | | | | | | | | | |
| | | MEK-ST ZL | | | | | | | | | | | | |
| | | AEROSIL 300 | | | | | | | | | | | | |
| Surfactant | | FP-1 | 0.1% | 0.1% | 0.1% | 0.1% | 0.1% | 0.1% | 0.1% | 0.1% | 0.1% | 0.1% | 0.1% | 0.1% |
| Solvent | | Methyl ethyl ketone (MEK) | 50% | 50% | 50% | 50% | 50% | 50% | 50% | 50% | 50% | 50% | 50% | 50% |
| | | Methyl isobutyl ketone (MiBK) | 50% | 50% | 50% | 50% | 50% | 50% | 50% | 50% | 50% | 50% | 50% | 50% |

| | | Laminated film No. | | | | | | | | |
|---|---|---|---|---|---|---|---|---|---|---|
| | | S1 | S2 | S3 | S4 | S5 | S6 | S7 | S8 |
| | | Polymerizable composition No. | | | | | | | | |
| | | A1 | A2 | A3 | A4 | A5 | A6 | A7 | A8 |
| Layer configuration | Thickness of cured layer | 5 μm | 5 μm | 5 μm | 5 μm | 5 μm | 5 μm | 5 μm | 5 μm |
| Evaluation results | Variation coefficient of occupied area proportion of silica particles A | 3.5% | 3.6% | — | 2.6% | 2.8% | 3.0% | 3.4% | — |
| | Variation coefficient of occupied area proportion of silica particles B | — | — | 0.0% | 0.0% | 0.0% | 0.0% | 0.0% | 0.0% |
| | Variation coefficient of occupied area proportion of other particles | — | — | — | — | — | — | — | 4.1% |
| | Occupied area proportion of silica particles A | 2.0% | 0.4% | — | 3.3% | 16.0% | 1.2% | 2.4% | — |
| | Occupied area proportion of silica particles B | — | — | 51.0% | 51.0% | 85.0% | 90.0% | 3.0% | 51.0% |
| | Occupied area proportion of silica particles A/occupied area proportion of silica particles B | — | — | 0.003 | 0.065 | 0.188 | 0.013 | 0.800 | — |
| | Haze of laminated film | 0.3% | 0.2% | 0.2% | 0.2% | 0.4% | 0.3% | 0.3% | 0.5% |
| | Total amplitude at wavelength of 2.50 to 5.00 μm | 0.060 nm | 0.040 nm | 0.003 nm | 0.030 nm | 0.045 nm | 0.009 nm | 0.055 nm | 0.090 nm |
| | Maximum height St | 120 nm | 105 nm | 5 nm | 60 nm | 90 nm | 50 nm | 115 nm | 180 nm |

TABLE 5-continued

| Average secondary particle diameter of silica particles a in dispersion liquid | 350 nm | 350 nm | — | 350 nm | 350 nm | 350 nm | 350 nm |
|---|---|---|---|---|---|---|---|
| Anti-blocking properties | A | A | C | A | A | A | A |
| White turbidity | C | C | B | B | C | C | C |
| Hardness | C | C | C | B | B | B | C |
| Scratch resistance | C | C | C | B | B | B | C |
| Comparative Example/Example | Comparative Example | Comparative Example | Comparative Example | Example | Example | Example | Comparative Example |

| | | Laminated film No. | | | |
|---|---|---|---|---|---|
| | | S9 | S10 | S11 | S12 |
| | | Polymerizable composition No. | | | |
| | | A9 | A10 | A11 | A12 |
| Layer configuration | Thickness of cured layer | 5 μm | 5 μm | 5 μm | 5 μm |
| Evaluation results | Variation coefficient of occupied area proportion of silica particles A | 3.5% | 3.5% | 3.5% | 3.8% |
| | Variation coefficient of occupied area proportion of silica particles B | — | — | — | 0.0% |
| | Variation coefficient of occupied area proportion of other particles | 0.2% | 0.8% | 1.0% | — |
| | Occupied area proportion of silica particles A | 2.0% | 2.0% | 2.0% | 1.8% |
| | Occupied area proportion of silica particles B | — | — | — | 51.0% |
| | Occupied area proportion of silica particles A/occupied area proportion of silica particles B | — | — | — | 0.035 |
| | Haze of laminated film | 1.2% | 1.1% | 1.1% | 0.5% |
| | Total amplitude at wavelength of 2.50 to 5.00 μm | 0.055 nm | 0.080 nm | 0.100 nm | 0.100 nm |
| | Maximum height St | 130 nm | 120 nm | 125 nm | 210 nm |
| | Average secondary particle diameter of silica particles a in dispersion liquid | 350 nm | 350 nm | 350 nm | — (addition of silica particles a while not performing dispersion in advance) |
| | Anti-blocking properties | A | A | A | A |
| | White turbidity | C | C | C | C |
| | Hardness | C | C | C | C |
| | Scratch resistance | C | C | C | C |
| | Comparative Example/Example | Comparative Example | Comparative Example | Comparative Example | Comparative Example |

TABLE 6

| | | A13 | A14 | A15 | A16 | A17 | A18 | A19 | A20 | A21 | A22 | A23 | A24 | A25 | A26 | A27 | A28 | A29 |
|---|---|---|---|---|---|---|---|---|---|---|---|---|---|---|---|---|---|---|
| Curable compound | DPHA | 80.9% | 80.9% | 80.9% | 80.9% | 80.9% | 80.9% | 80.9% | 80.9% | 80.9% | 80.9% | 80.9% | 80.9% | 80.9% | 59.9% | 57.1% | 57.1% | 57.1% |
| | CELLOXIDE 2021P | | | | | | | | | | | | | | 20.0% | 23.0% | 23.0% | 23.0% |
| | CYCLOMER M100 | | | | | | | | | | | | | | | | | |
| Polymerization initiator | Radical polymerization initiator | 3.0% | 3.0% | 3.0% | 3.0% | 3.0% | 3.0% | 3.0% | 3.0% | 3.0% | 3.0% | 3.0% | 3.0% | 3.0% | 3.0% | 3.0% | 3.0% | 3.0% |
| | Cation polymerization initiator | | | | | | | | | | | | | | 1.0% | 0.8% | 0.8% | 0.8% |
| Silica particles a | AEROSIL R805 | 1.0% | | | | | | | | | | | | | | | | |
| | AEROSIL R976S | | 1.0% | | | | | | | | | | | | | | | |
| | AEROSIL R104 | | | 1.0% | | | | | | | | | | | | | | |
| | AEROSIL RX50 | | | | 1.0% | | | | | | | | | | | | | |
| | AEROSIL NX90G | | | | | 1.0% | | | | | | | | | | | | |
| | AEROSIL RX200 | | | | | | 1.0% | | | | | | | | | | | |
| | AEROSIL RX300 | | | | | | | 1.0% | | | | | | | | | | |
| | AEROSIL R812 | | | | | | | | 1.0% | | | | | | | | | |
| | AEROSIL RA200H | | | | | | | | | 1.0% | | | | | | | | |
| | AEROSIL RY200 | | | | | | | | | | 1.0% | | | | | | | |
| | AEROSIL R711 | | | | | | | | | | | 1.0% | 1.0% | 1.0% | 1.0% | 1.0% | 1.0% | 1.0% |
| Silica particles b | MEK-ST | | | | | | | | | | | | | | | | | |
| | MEK-EC-2130Y | 15.0% | 15.0% | 15.0% | 15.0% | 15.0% | 15.0% | 15.0% | 15.0% | 15.0% | 15.0% | 15.0% | 15.0% | | | 15.0% | 15.0% | 15.0% |
| | MEK-AC-2140Z | | | | | | | | | | | | | 15.0% | 15.0% | | | |
| | MEK-AC-4130Z | | | | | | | | | | | | | | | | | |
| Content of silica particles a/content of silica particles b | | 0.067 | 0.067 | 0.067 | 0.067 | 0.067 | 0.067 | 0.067 | 0.067 | 0.067 | 0.067 | 0.067 | 0.067 | 0.067 | 0.067 | 0.067 | 0.067 | 0.067 |
| Other particles | OSCAL 1432M | | | | | | | | | | | | | | | | | |
| | SNOWTEX ST-30 | | | | | | | | | | | | | | | | | |
| | MEK-ST ZL | | | | | | | | | | | | | | | | | |
| | AEROSIL 300 | | | | | | | | | | | | | | | | | |
| Surfactant | FP-1 | 0.1% | 0.1% | 0.1% | 0.1% | 0.1% | 0.1% | 0.1% | 0.1% | 0.1% | 0.1% | 0.1% | 0.1% | 0.1% | 0.1% | 0.1% | 0.1% | 0.1% |
| Solvent | Methyl ethyl ketone (MEK) | 50% | 50% | 50% | 50% | 50% | 50% | 50% | 50% | 50% | 50% | 50% | 50% | 50% | 50% | 50% | 50% | 50% |
| | Methyl isobutyl ketone (MiBK) | 50% | 50% | 50% | 50% | 50% | 50% | 50% | 50% | 50% | 50% | 50% | 50% | 50% | 50% | 50% | 50% | 50% |

| | | Laminated film No. | | | | | | | | | |
|---|---|---|---|---|---|---|---|---|---|---|---|
| | | S13 | S14 | S15 | S16 | S17 | S18 | S19 | S20 | S21 | S22 |
| | | Polymerizable composition No. | | | | | | | | | |
| | | A13 | A14 | A15 | A16 | A17 | A18 | A19 | A20 | A21 | A22 |
| Layer configuration | Thickness of cured layer | 5 μm | 5 μm | 5 μm | 5 μm | 5 μm | 5 μm | 5 μm | 5 μm | 5 μm | 5 μm |
| Evaluation results | Variation coefficient of occupied area proportion of silica particles A | 2.7% | 0.7% | 2.8% | 2.7% | 2.7% | 1.8% | 1.8% | 0.8% | 2.7% | 2.8% |
| | Variation coefficient of occupied area proportion of silica particles B | 0.0% | 0.0% | 0.0% | 0.0% | 0.0% | 0.0% | 0.0% | 0.0% | 0.0% | 0.0% |
| | Variation coefficient of occupied area proportion of other particles | — | — | — | — | — | — | — | — | — | — |
| | Occupied area proportion of silica particles A | 3.2% | 4.6% | 3.1% | 3.2% | 3.3% | 4.1% | 4.1% | 4.5% | 3.2% | 3.0% |

TABLE 6-continued

| | | | | | | | | | |
|---|---|---|---|---|---|---|---|---|---|
| Occupied area proportion of silica particles B | 51.0% | 51.0% | 51.0% | 51.0% | 51.0% | 51.0% | 51.0% | 51.0% | 51.0% |
| Occupied area proportion of silica particles A/occupied area proportion of silica particles B | 0.063 | 0.090 | 0.061 | 0.063 | 0.065 | 0.080 | 0.080 | 0.088 | 0.063 | 0.059 |
| Haze of laminated film | 0.2% | 0.2% | 0.2% | 0.2% | 0.2% | 0.2% | 0.2% | 0.2% | 0.2% | 0.2% |
| Total amplitude at wavelength of 2.50 to 5.00 μm | 0.008 nm | 0.007 nm | 0.040 nm | 0.035 nm | 0.031 nm | 0.015 nm | 0.011 nm | 0.009 nm | 0.029 nm | 0.031 nm |
| Maximum height St | 70 nm | 45 nm | 85 nm | 80 nm | 79 nm | 25 nm | 22 m | 45 nm | 74 nm | 76 nm |
| Average secondary particle diameter of silica particles a in dispersion liquid | 300 nm | 350 nm | 240 nm | 250 nm | 220 nm | 190 nm | 195 nm | 320 nm | 300 nm | 300 nm |
| Anti-blocking properties | B | B | A | A | A | A | A | B | A | A |
| White turbidity | B | B | B | A | B | A | A | B | B | B |
| Hardness | B | B | A | A | A | A | A | B | B | B |
| Scratch resistance | B | B | A | A | A | A | A | B | B | B |
| Comparative Example/Example | Example | Example | Example | Example | Example | Example | Example | Example | Example | Example |

| | | Laminated film No. | | | | | | |
|---|---|---|---|---|---|---|---|---|
| | | S23 | S24 | S25 | S26 | S27 | S28 | S29 |
| | | | | Polymerizable composition No. | | | | |
| | | A23 | A24 | A25 | A26 | A27 | A28 | A29 |
| Layer configuration | Thickness of cured layer | 5 μm | 5 μm | 5 μm | 5 μm | 5 μm | 3 μm | 30 μm |
| | Variation coefficient of occupied area proportion of silica particles A | 2.4% | 2.8% | 2.0% | 1.8% | 1.8% | 1.8% | 1.8% |
| | Variation coefficient of occupied area proportion of silica particles B | 0.1% | 0.2% | 0.0% | 0.0% | 0.0% | 0.0% | 0.0% |
| | Variation coefficient of occupied area proportion of other particles | — | — | — | — | — | — | — |
| Evaluation results | Occupied area proportion of silica particles A | 3.5% | 3.0% | 3.8% | 4.1% | 4.1% | 4.1% | 4.1% |
| | Occupied area proportion of silica particles B | 50.0% | 45.0% | 42.0% | 51.0% | 51.0% | 51.0% | 51.0% |
| | Occupied area proportion of silica particles A/occupied area proportion of silica particles B | 0.070 | 0.067 | 0.090 | 0.080 | 0.080 | 0.080 | 0.080 |
| | Haze of laminated film | 0.2% | 0.2% | 0.2% | 0.2% | 0.2% | 0.2% | 0.2% |
| | Total amplitude at wavelength of 2.50 to 5.00 μm | 0.031 nm | 0.041 nm | 0.038 nm | 0.015 nm | 0.015 nm | 0.012 nm | 0.018 nm |
| | Maximum height St | 35 nm | 65 nm | 49 nm | 25 nm | 25 nm | 22 nm | 28 nm |
| | Average secondary particle diameter of silica particles a in dispersion liquid | 190 nm | 190 nm | 190 nm | 190 nm | 190 nm | 190 nm | 190 nm |
| | Anti-blocking properties | A | A | A | A | A | A | A |
| | White turbidity | B | B | B | A | A | A | A |
| | Hardness | B | B | A | B | A | B | A |
| | Scratch resistance | B | B | B | B | B | A | A |
| | Comparative Example/Example | Example | Example | Example | Example | Example | Example | Example |

From the results presented in Tables 5 and 6, it was confirmed that the laminated films of Examples had excellent anti-blocking properties and suppressed occurrence of white turbidity.

In addition, from the results presented in Tables 5 and 6, it was also confirmed that the laminated films of Examples were films having excellent scratch resistance of the surface of the cured layer. Such laminated films having excellent scratch resistance are suitable as a film generally called a hardcoat film, which is used for improvement of scratch resistance of various articles, or the like. As the hardcoat film, a film from which the evaluation result on the hardness to be evaluated by the above-described method is A or B is preferable, and a film from which the evaluation result is A is preferable.

Among those, the laminated films of Examples using silica particles having a trimethylsilyl group on the surface thereof as the silica particles a had high hardness and particularly excellent scratch resistance (for example, Evaluation A, that is, a case where scratch is not observed under a load of 700 g).

<Manufacture of Polarizing Plate>
(Manufacture of Cellulose Acylate Film)
—Manufacture of Core Layer Cellulose Acylate Dope—

The following compositions were put into a mixing tank and stirred, and the respective components were dissolved to prepare cellulose acylate solutions for use as a core layer cellulose acylate dope.

| Core layer cellulose acylate dope | |
|---|---|
| Cellulose acetate with acetyl substitution degree of 2.88 | 100 parts by mass |
| Polyester A | 12 parts by mass |
| Methylene chloride (first solvent) | 430 parts by mass |
| Methanol (second solvent) | 64 parts by mass |

(Polyester A: A polyester which is a polymer of 50% by mole of 4-methyl-1,2-cyclohexyldicarboxylic acid and 50% by mole of ethylene glycol, and has a terminal structure of a cyclohexanoyl group, and a number-average molecular weight of 850)

—Manufacture of Outer Layer Cellulose Acylate Dope—

10 parts by mass of the following matte agent solution was added to 90 parts by mass of the core layer cellulose acylate dope to prepare a cellulose acylate solution for use as an outer layer cellulose acylate dope.

| Matte agent solution | |
|---|---|
| Silica particles (AEROSIL R972 manufactured by Nippon Aerosil Co., Ltd.) | 2 parts by mass |
| Methylene chloride (first solvent) | 76 parts by mass |
| Methanol (second solvent) | 11 parts by mass |
| Core layer cellulose acylate dope | 1 part by mass |

The core layer cellulose acylate dope and the outer layer cellulose acylate dope were filtered through a filter paper having an average pore diameter of 34 μm and a sintered metal filter having an average pore diameter of 10 μm, and then three layers of the core layer cellulose acylate dope and the outer layer cellulose acylate dope on both sides thereof were simultaneously cast on a drum having a surface temperature of 20° C. from the casting port (drum casting machine). The film on the drum was peeled off in a state where the solvent content was about 20% by mass, both ends of the film in the width direction were fixed with tenter clips, and the film was dried while stretching the film at a stretching ratio of 1.1 times in the lateral direction. The film after drying was further dried by transporting the film between rolls of a heat treatment device to obtain a cellulose acylate film in which the thickness of the core layer was 16 μm, the thickness of each of the outer layers positioned on both sides of the core layer was 2 μm, and the film thickness was 20 μm.

(Saponification of Film)

The respective laminated films manufactured in Examples and Comparative Examples and the cellulose acylate films manufactured above were immersed for one minute in a 4.5 mol/L aqueous sodium hydroxide solution (saponification solution) of which the temperature was adjusted to a liquid temperature of 37° C. Thereafter, the film was washed with water, immersed in a 0.05 mol/L aqueous sulfuric acid solution for 30 seconds and then further passed through a water washing bath. Further, water dripping with an air knife was repeated three times so as to drop water, and the film was retained and dried in a drying zone at an atmosphere temperature of 70° C. for 15 seconds to manufacture a saponification-treated film.

(Manufacture of Polarizer)

According to Example 1 of JP2001-141926A, a stretched polyvinyl alcohol-based film was adsorbed with iodine to manufacture a polarizer (iodine-dyed polyvinyl alcohol-based film) having a thickness of 7 μm.

(Manufacture of Polarizing Plate (Bonding of Polarizer and Protective Film))

The polarizer manufactured above was interposed between a laminated film of Examples or Comparative Examples saponified above as one protective film and a cellulose acylate film saponified above as the other protective film, and then roll-to-roll bonding was performed using a 3% aqueous solution of polyvinyl alcohol (PVA-117H manufactured by Kuraray Co., Ltd.) as an adhesive, such that an absorption axis and the longitudinal direction of the film were orthogonal to each other, so as to manufacture a polarizing plate. Here, in the laminated film of Examples or Comparative Examples, the surface of the saponified substrate film and the polarizer were bonded. In this manner, the respective polarizing plates of Examples and Comparative Examples were obtained.

<Manufacture of Liquid Crystal Display>

The front-side polarizing plate of a commercially available IPS type liquid crystal TV (42LS5600 manufactured by LG Electronics) was peeled and removed, and the polarizing plates of Examples and Comparative Examples were bonded as the front-side polarizing plate instead, such that the absorption axis was in the longitudinal direction (horizontal direction) via a pressure sensitive adhesive such that the cured layer became the outermost surface, thereby obtaining a liquid crystal display.

<Manufacture of Liquid Crystal Display Having in-Cell Touch Panel Liquid Crystal Element>

An in-cell touch panel liquid crystal element incorporated into a commercially available liquid crystal display (XPERIA P manufactured by Sony Ericsson) was prepared. Each of the polarizing plates of Examples was bonded to the in-cell touch panel liquid crystal element via an adhesive layer having a thickness of 20 μm.

<Manufacture of Liquid Crystal Display Having On-Cell Touch Panel Liquid Crystal Element>

The respective polarizing plates of Examples were bonded onto the touch panel sensor integrated color filter described in paragraphs 0139 to 0143 of JP2012-088683A via an adhesive layer having a thickness of 20 μm.

The present invention is useful in the technical field of liquid crystal displays.

What is claimed is:

1. A laminated film comprising:
a substrate film; and
a cured layer obtained by curing a curable composition, wherein the haze of the laminated film is 1.0% or less, wherein the cured layer includes:
silica particles A: silica particles which have a hydrophobic group on a surface thereof and an average primary particle diameter in the range of 5 to 50 nm, and are observed as a continuous black portion with a length of 100 nm or more in a binarized image obtained by subjecting a cross-sectional transmission electron microscopic image of the cured layer to a binarization processing, and
silica particles B: silica particles other than the silica particles A, which have a hydrophobic group on a surface thereof and an average primary particle diameter in the range of 7 to 50 nm,
wherein an occupied area proportion of the silica particles A in the cross-sectional transmission electron microscopic image of the cured layer is in the range of 0.5% to 20.0%, and satisfies a relationship of the following formula with an occupied area proportion of the silica particles B in the cross-sectional transmission electron microscopic image of the cured layer:
0.005≤occupied area proportion of silica particles A/occupied area proportion of silica particles B≤0.400,
wherein in the cross-sectional transmission electron microscopic image of the cured layer, the variation coefficient of the occupied area proportion of the silica particles A is more than 0.5% and 3.0% or less, and the variation coefficient of the occupied area proportion of the silica particles B is in the range of 0.0% to 0.5%, and
wherein a Brunauer-Emmett-Teller (BET) method specific surface area of the silica particles A is in the range of 30 to 400 m$^2$/g.

2. The laminated film according to claim 1,
wherein a total amplitude at a wavelength of 2.50 to 5.00 μm of an unevenness profile measured on the surface of a cured layer is in the range of 0.007 to 0.050 nm, and the maximum height St of the unevenness profile measured on the surface of the cured layer is in the range of 7 to 100 nm.

3. The laminated film according to claim 1,
wherein the silica particles A have a value obtained by dividing a carbon content of the silica particles A (g/m$^2$) by the Brunauer-Emmett-Teller (BET) method specific surface area in the range of 0.005 to 0.150.

4. The laminated film according to claim 1,
wherein the silica particles A have a value obtained by dividing a carbon content of the silica particles A (g/m$^2$) by the Brunauer-Emmett-Teller (BET) method specific surface area in the range of 0.010 to 0.030.

5. The laminated film according to claim 1,
wherein the hydrophobic group on the surface of the silica particles B is selected from the group consisting of an alkylsilyl group, a vinylsilyl group-derived residue, an epoxysilyl group-derived residue, and a (meth)acryloxysilyl group-derived residue.

6. The laminated film according to claim 1,
wherein the curable composition includes a curable compound selected from the group consisting of a polyfunctional (meth)acrylate compound and an epoxy compound.

7. The laminated film according to claim 1,
wherein the curable composition further includes a polymerization initiator.

8. The laminated film according to claim 1, wherein the content of the silica particles A ranges from 0.3% by mass to 5.0% by mass based on the total mass of the cured layer.

9. The laminated film according to claim 1,
wherein the occupied area proportion of the silica particles A in the cross-sectional transmission electron microscopic image of the cured layer satisfies a relationship of the following formula with the occupied area proportion of the silica particles B in the cross-sectional transmission electron microscopic image of the cured layer:
0.005≤occupied area proportion of silica particles A/occupied area proportion of silica particles B≤0.150.

10. A polarizing plate comprising:
a polarizer; and
the laminated film according to claim 1.

11. A liquid crystal panel comprising:
a liquid crystal display element; and
the polarizing plate according to claim 10.

12. A liquid crystal display comprising:
the liquid crystal panel according to claim 11; and
a backlight unit.

13. A touch panel comprising the laminated film according to claim 1.

14. A method for producing a laminated film,
wherein the laminated film is the laminated film according to claim 1, and
the method comprising:
dispersing silica particles having a hydrophobic group on a surface thereof and an average primary particle diameter of 5 to 50 nm in an organic solvent to prepare a silica particle-containing composition 1;
mixing the silica particle-containing composition 1 with a silica particle-containing composition 2 including silica particles having a hydrophobic group on a surface thereof and an average primary particle diameter of 7 to 50 nm in an organic solvent, and a curable compound to prepare a curable composition;
applying the curable composition onto a substrate film; and
curing the applied curable composition.

15. The method for producing the laminated film according to claim 14,
wherein an average secondary particle diameter of the silica particles in the silica particle-containing composition 1 is in the range of 100 to 500 nm.

* * * * *